(12) United States Patent
Groom et al.

(10) Patent No.: US 11,748,704 B1
(45) Date of Patent: Sep. 5, 2023

(54) DIGITAL TAGS TO FACILITATE PRODUCTION, COLLABORATION, TRANSPARENCY, PRIVACY, AUTHENTICATION, HISTORY, SYNCHRONIZATION, OWNERSHIP, AND REGULATORY COMPLIANCE DURING THE CREATION AND USE OF A PRODUCT

(71) Applicant: Groom Ventures LLC, Manassas, VA (US)

(72) Inventors: John F. Groom, Manassas, VA (US);
Bryan Matott, Woodbridge, VA (US);
B Prudhvi Nag, Sri Kalahasti (IN)

(73) Assignee: Groom Ventures LLC, Manassas, VA (US)

( * ) Notice: Subject to any disclaimer, the term of this patent is extended or adjusted under 35 U.S.C. 154(b) by 0 days.

(21) Appl. No.: 17/819,599

(22) Filed: Aug. 12, 2022

(51) Int. Cl.
*G06Q 10/087* (2023.01)
*G06Q 30/018* (2023.01)

(52) U.S. Cl.
CPC ......... *G06Q 10/087* (2013.01); *G06Q 30/018* (2013.01); *G06Q 2220/00* (2013.01)

(58) Field of Classification Search
CPC . G06Q 10/087; G06Q 30/018; G06Q 2220/00
USPC .......................................................... 705/28
See application file for complete search history.

(56) References Cited

U.S. PATENT DOCUMENTS

| 2016/0358186 A1 | 12/2016 | Radocchia et al. |
| 2017/0345019 A1 | 11/2017 | Radocchia et al. |
| 2018/0264347 A1* | 9/2018 | Tran .................. A63B 43/004 |
| 2019/0361917 A1* | 11/2019 | Tran .................. G06Q 20/308 |
| 2021/0258155 A1 | 8/2021 | Andon et al. |
| 2021/0342957 A1 | 11/2021 | Small et al. |

(Continued)

FOREIGN PATENT DOCUMENTS

| KR | 1020210133756 A | 11/2021 |
| WO | 2022133330 A1 | 6/2022 |

OTHER PUBLICATIONS

Chronicled, "Chronicled." Chronicled, Accessed Apr. 25, 2022, retrieved from the internet, https://www.chronicled.com/.

(Continued)

*Primary Examiner* — Garcia Ade
(74) *Attorney, Agent, or Firm* — Craige Thompson; Thompson Patent Law; Timothy D. Snowden

(57) ABSTRACT

Apparatus and associated methods relate to a digital tagging system (DTS) to facilitate collaborative production, transparency, and regulatory compliances. In an illustrative example, the DTS may generate a digital object associated with a physical object. The digital object, for example, may include a public attribute profile and a private data profile. For example, the DTS may cumulatively associate transaction data to the public attribute profile based on a first and a second set of predetermined rules. The DTS may, for example, store some transaction data to the private attribute profile according to a third set of predetermined rules. In some implementations, the DTS may generate a unique link associated with the digital object. For example, a user may access the public attribute profiles by accessing the unique link. Various embodiments may advantageously provide immutable historic transaction data of a physical object via from creation to present time.

21 Claims, 18 Drawing Sheets

(56) References Cited

U.S. PATENT DOCUMENTS

2022/0036302 A1* 2/2022 Cella .................. G06Q 10/0835
2022/0253871 A1* 8/2022 Miller .................. G06Q 30/018

OTHER PUBLICATIONS

Chronicled, "Chronicled Protocol Development Timeline," LinkedIn, Accessed Apr. 25, 2022, retrieved from the Internet, https://www.linkedin.com/in/samantharadocchia/details/experience/1544653239800/single-media-viewer/.

Clark, M. "Startup Tracks Fine Art Provenance Using NFC Tags and Blockchain Registry," NFCW (blog), Sep. 24, 2018, retrieved from the internet, https://www.nfcw.com/2018/09/24/358091/art-provenance-nfc-tags-blockchain/.

Fries, T. CryptoKicks: Nike to Tokenize Shoe Ownership on Ethereum, The Tokenist, May 25, 2021, retrieved from the internet https://tokenist.com/cryptokicks-nike-to-tokenize-shoe-ownership-on-ethereum/.

Migirov, et al, "CryptoSeals Features NFC Chip Having Unique Identity Information." Thomas, Accessed Apr. 25, 2022, retrieved from the internet, https://news.thomasnet.com/fullstory/cryptoseals-features-nfc-chip-having-unique-identity-information-40000570.

Radocchia, S., "An Introduction to Art on Blockchain: Applications and Industry Affects," Blockchain Art Collective (blog), Mar. 1, 2018, retrieved from the internet, https://medium.com/blockchain-art-collective/an-introduction-to-art-on-blockchain-applications-and-industry-affects-cf37809756e2.

Radocchia, S., "Sam Rad (Radocchia)," LinkedIn, Accessed Apr. 25, 2022, retrieved from the internet, https://www.linkedin.com/in/samantharadocchia/details/experience/.

* cited by examiner

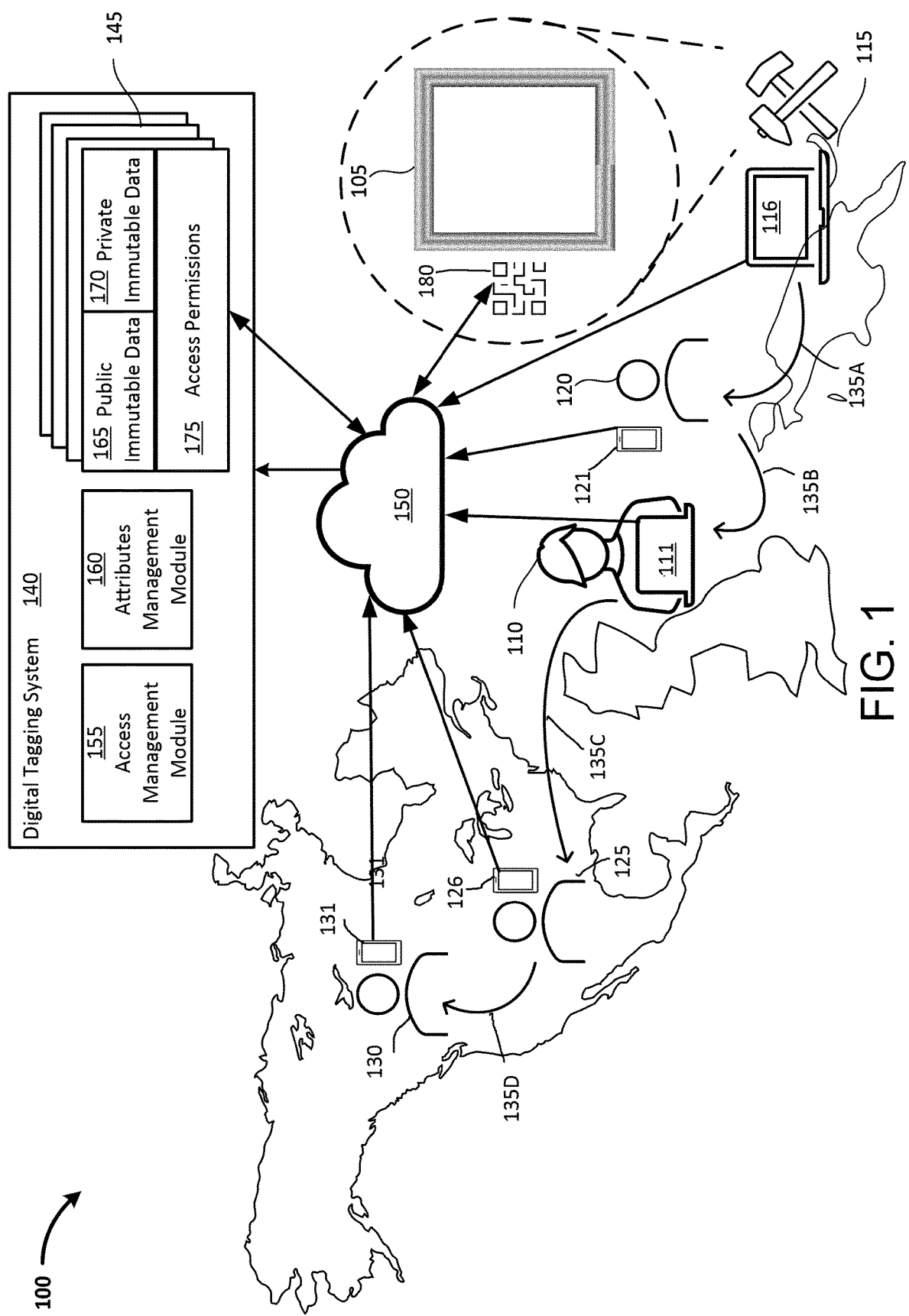

FIG. 4D

DIGITAL TAGS TO FACILITATE PRODUCTION, COLLABORATION, TRANSPARENCY, PRIVACY, AUTHENTICATION, HISTORY, SYNCHRONIZATION, OWNERSHIP, AND REGULATORY COMPLIANCE DURING THE CREATION AND USE OF A PRODUCT

TECHNICAL FIELD

Various embodiments relate generally to remotely associate, authenticate, and access public and private digital transactional data of a physical object.

BACKGROUND

A global supply chain often involves multiple parties in multiple locations to create products. For example, beginning with a creator/designer's original idea and specification of a product, multiple entities, including, for example, factory/workshop technicians, material sourcing agent, contractors of the factory/workshop, may contribute to creating the product. In some examples, history of collaboration and some details of the products may be useful and/or valuable for the products. For example, a hang tag or a label of a garment may include basic information such as materials and country of origin of the garment.

In international economies, for example, a sustainable supply chain may often highly emphasize a transparent production. For example, many sustainable companies may require declaration of a source of the product's material and, sometimes, a source of the product's material's material. In some cases, processes involved in producing the product may be required to be explained exactly.

SUMMARY

Apparatus and associated methods relate to a digital tagging system (DTS) to facilitate collaborative production, transparency, and regulatory compliances. In an illustrative example, the DTS may generate a digital object associated with a physical object. The digital object, for example, may include a public attribute profile and a private data profile. For example, the DTS may cumulatively associate transaction data to the public attribute profile based on a first and a second set of predetermined rules. The DTS may, for example, store some transaction data to the private attribute profile according to a third set of predetermined rules. In some implementations, the DTS may generate a unique link associated with the digital object. For example, a user may access the public attribute profiles by accessing the unique link. Various embodiments may advantageously provide immutable historic transaction data of a physical object via from creation to present time.

Various embodiments may achieve one or more advantages. For example, some embodiments may include predetermined access permissions to advantageously authorize access devices to view the digital object. Some embodiments may include, for example, generating a graphical user interface displaying a location of each historical transaction of the physical object to advantageously provide a chronology of the physical object from creation to present time. For example, some embodiments may advantageously retrieve product labeling requirements for cross jurisdiction transactions based on predetermined attributes retrieved from the digital object. Some embodiments may, for example, include authentication operations to advantageously authenticate the physical object using the unique link associated with the digital object.

Various implementations may, by way of example and not limitation, advantageously provide a technical solution to a technical problem of generating, updating, tracking, locating, and/or displaying immutable (e.g., digital) records of actual physical object history based on actual time and location of terminal devices (e.g., user devices, computers, smartphones). Some implementations may, by way of example and not limitation, advantageously also provide a technical solution to the technological problem of providing such immutable records of actual physical object history while parsing public and private data at each step and for each subsequent transaction(s). Some implementations may, by way of example and not limitation, advantageously also provide a technical solution to the technological problem of providing such immutable records of actual physical object history while providing, recording, storing, and/or distributing (e.g., according to predetermined rules) multidirectional (e.g., 2-way, 3-way) communication for each transaction between parties involved in the transaction, in prior transaction(s), and/or in subsequent transaction(s). Various such implementations may, for example, advantageously solve a technical problem of collecting, maintaining, authenticating, and/or demonstrating proof of item history while maintaining integrity of private communication involved but not publicized.

Various embodiments may, by way of example and not limitation, advantageously provide one or more processes using digital tags to facilitate production of a product. Various embodiments may, for example, advantageously provide one or more processes using digital tags to facilitate collaboration on a product. Various embodiments may, for example, advantageously provide one or more processes using digital tags to facilitate transparency regarding a product. Various embodiments may, for example, advantageously provide one or more processes using digital tags to facilitate privacy regarding a product. Various embodiments may, for example, advantageously provide one or more processes using digital tags to facilitate authentication of one or more attributes (e.g., historical attributes, processes) of a product. Various embodiments may, for example, advantageously provide one or more processes using digital tags to facilitate history of a product. Various embodiments may, for example, advantageously provide one or more processes using digital tags to facilitate synchronization regarding a product. Various embodiments may, for example, advantageously provide one or more processes using digital tags to facilitate ownership processes regarding a product. Various embodiments may, for example, advantageously provide one or more processes using digital tags to facilitate regulatory compliance of a product. For example, various embodiments may advantageously provide technical solution(s) to technological problems encountered during the creation and/or use of a product.

The details of various embodiments are set forth in the accompanying drawings and the description below. Other features and advantages will be apparent from the description and drawings, and from the claims.

BRIEF DESCRIPTION OF THE DRAWINGS

FIG. 1 depicts an exemplary digital tagging system (DTS) employed in an illustrative use-case scenario.

FIG. 4A, FIG. 4B, FIG. 4C, FIG. 4D, and FIG. 4E depict exemplary graphic user interfaces (GUI) for managing an exemplary cumulative digital tag associated with a physical object.

Like reference symbols in the various drawings indicate like elements.

DETAILED DESCRIPTION OF ILLUSTRATIVE EMBODIMENTS

Figure 13:
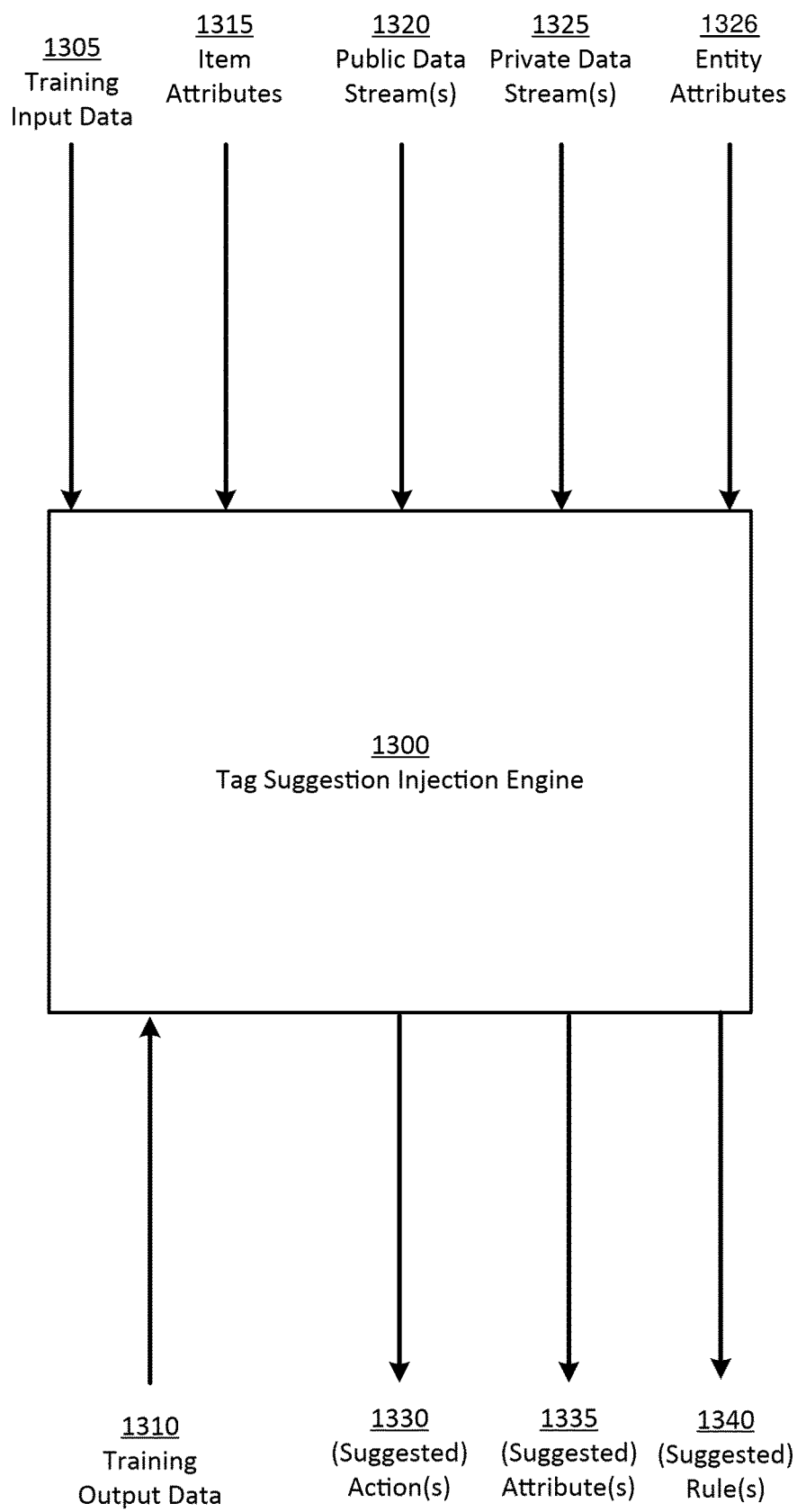
FIG. 13 depicts an exemplary machine learning engine for tag suggestion(s) injection.
Figure 14:
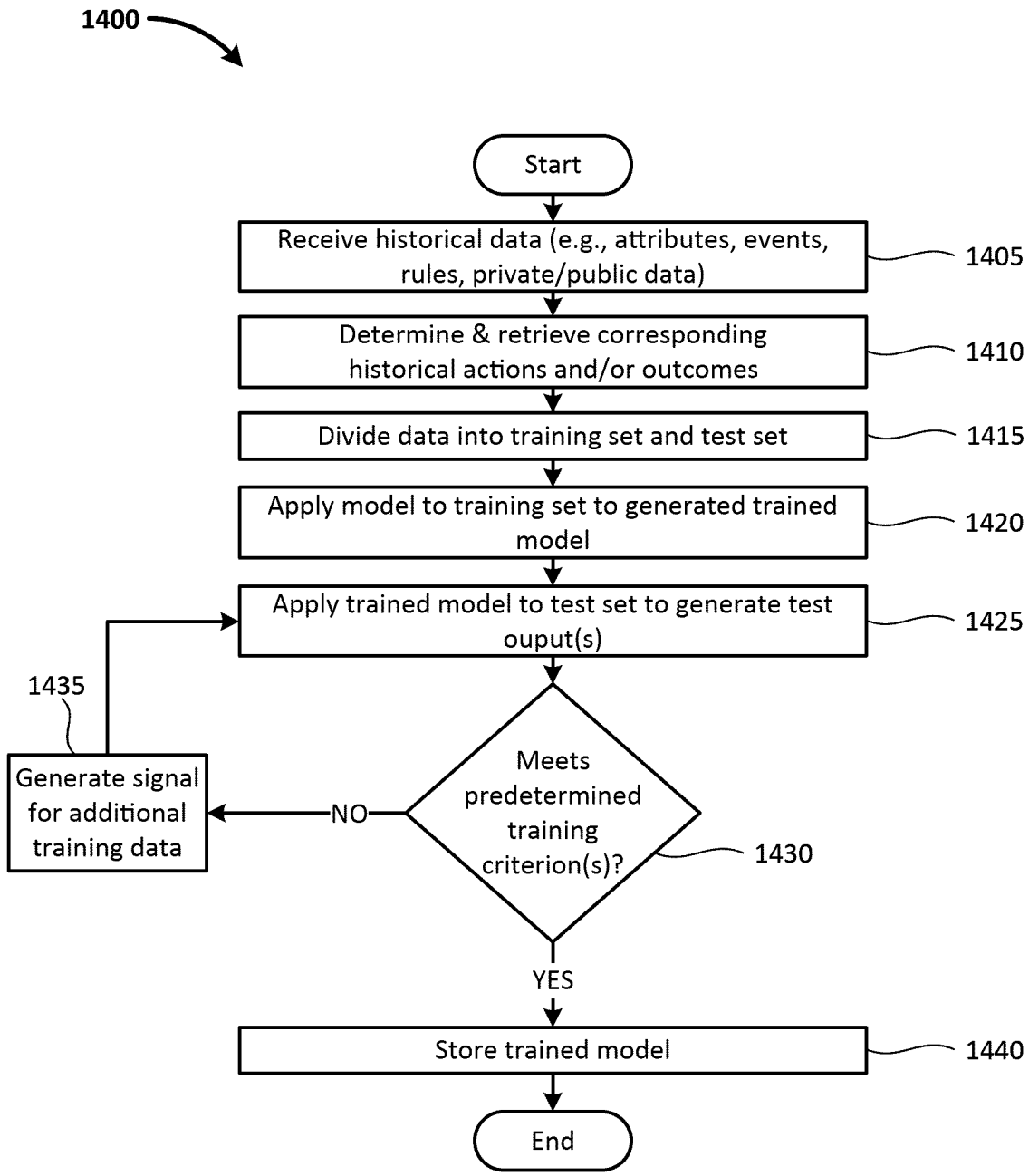
FIG. 14 depicts an exemplary method of training a tag suggestion injection engine.

To aid understanding, this document is organized as follows. First, to help introduce discussion of various embodiments, a digital tagging system DTS is introduced with reference to FIGS. 1-3. Second, that introduction leads into a description with reference to FIGS. 4A-4E of some exemplary embodiments of user interface for the DTS. Third, with reference to FIGS. 5-8, exemplary methods are described in application to generate and manage an exemplary cumulative digital tag (CDT). Fourth, with reference to FIGS. 9A-10, the discussion turns to exemplary embodiments that illustrate generating and displaying historical transactions of a CDT geographically. Fifth, and with reference to FIGS. 11-12, this document describes exemplary apparatus and methods useful for transferring an ownership of a physical object in the DTS. Turning, sixth to FIGS. 13-14, illustrative machine learning model(s) and applications thereof are disclosed. Finally, the document discusses further embodiments, exemplary applications and aspects relating to use CDT to facilitate production, collaboration, transparency, synchronization, ownership authentication, and regulatory compliance for physical objects using the DTS.

FIG. 1 depicts an exemplary digital tagging system (DTS) employed in an illustrative use-case scenario. As shown in FIG. 1, an exemplary possession chain 100 of a physical object 105 (e.g., a picture frame) is depicted. In other examples, the physical object 105 may be garment, bags, purse, leather products, shoes, art, vehicles, other crafts, and/or a combination thereof.

As an illustrative example, the physical object 105 may be transferred between multiple physical locations/entities before reaching to a consumer. As an illustrative example, the physical object 105 may be made in Indonesia. After production, the physical object 105 may be transported to a warehouse in the United Kingdom, for example. In some examples, the physical object 105 may be bought by a buyer in the United States. For example, the physical object 105 may be purchased again by a buyer in Canada in a secondary market.

In this example, the possession chain 100 includes multiple transaction entities. For example, some transaction entities may possess the physical object 105 for some time without owning the physical object. In this example, the transaction entities include a designer 110 (e.g., a designer), a maker 115, a merchandizing entity 120 (e.g., a local agent, an assistant designer, a consultant, and/or shipping entities collaborating with the designer 110 to develop the physical object 105), a first buyer 125, and a second buyer 130 of the physical object 105. In some implementations, other transaction entities may be possible. For example, the possession chain 100 may include other entities that may temporarily or permanently possess the physical object including, for example, retailers, initial purchasers, secondary market purchasers, servicers of the product (e.g., a cleaning service entity, a maintenance entity), and, sometimes, for example, to a service provider for giving away or disposing the physical object 105. For example, some transaction entities may be an owner of the physical object 105. For example, some transaction entities may be a service provider or a collaborator (e.g., craftsmen involved in making the physical object) of the physical object.

As shown, the possession chain 100 includes a digital tagging system (DTS 140) to cumulatively document each transfer of the physical object 105 in a cumulative digital tag (CDT 145). In this example, before reaching to the second buyer 130, at least four possession transfers 135A, 135B, 135C, 135D occurred. For example, the CDT 145 may store separate transaction records of information for each of the transfers 135A-D. In some implementations, the DTS 140 may receive input data for updating the CDT 145 via a communication network 150. For example, the transaction entities may use their respective devices 111, 116, 121, 126, and 131 to access the DTS 140 and update the CDT 145. For example, the devices 111, 116, 121, 126, and 131 may display a user interface for updating the CDT 145.

As shown, the DTS 140 includes an access management module 155 and an attributes management module 160. For example, the access management module 155 may provide an owner of the physical object 105 to grant access rights to add information to the CDT 145. For example, the attributes management module 160 may automatically generate and store information (e.g., geographical information, time-zone information, cross jurisdiction requirements) to the CDT 145.

The CDT 145 includes, cumulatively, a public immutable data 165 and a private immutable data 170 for each of the transfer 135A-D. In some examples, the public immutable data 165 and the private immutable data 170 may not be changed after being created. In various implementations, the attributes management module 160 may, after receiving information from a transaction party, determine whether the received information is to be stored in the public immutable data 165 or the private immutable data 170 based on, for example, a predetermined set of rules. For example, some of the predetermined set of rules may be selected by an owner of the physical object 105. The public immutable data 165 may include, for example, product details of the physical object including, as an example without limitation, material, a production location, manufacturing techniques, and/or production dates related to the physical object 105. The private immutable data 170 may include, for example, historical price information of the physical object 105, trade secrets, some conversation between different entities in the possession chain 100, and/or other sensitive proprietary information.

In some examples, at each stage of the product, the transaction entities may choose to make some data and facts either public or private. In various examples, the CDT 145 may monotonically increase in size as the product goes through the development process. In some implementations, the data entered at each stage of the development process may be immutable and not altered by later users. For example, the later user may add, separately, explanatory notes.

The DTS 140 generates a unique access image 180, in this example, for accessing the CDT 145 of the physical object 105. In some implementations, using the unique access image 180 (e.g., by scanning the unique access image 180 and connecting to the communication network 150), potential buyers of the physical object 105 may view the public immutable data 165 of the physical object 105. For example, the potential buyers may review history of the item, including production techniques and locations, materials used, involved parties, and other public data included.

In some implementations, the private immutable data 170 may also be reviewed by a transaction entity with a private data access permission. In the depicted example, the CDT 145 includes access permissions 175. In some implementations, the access permissions 175 may specify who can view the private immutable data of the CDT 135. The access permissions 175 may, in some implementations, be selectively determined by a buyer entity of a transaction. For example, in the transfer 135D, the second buyer 130 may determine the access permissions 175 of a transaction record corresponding to the transfer 135D. In some examples, without access permission, an access device requesting to view the CDT 135 may have restricted access to private data of the CDT.

In some examples, a potential buyer of the physical object 105 may desire to check the history (e.g., materials, original design concepts, record of agreements) of the physical object 105 before purchasing from the second buyer 130. For example, the potential buyer may, without using the DTS 140, inquire the second buyer 130 for the desired information. However, the second buyer 130 may have incomplete records (e.g., loss possession of documents, the first buyer 125 did not hand over the documents) of the physical object to answer the potential buyer accurately. The potential buyer may also lack a mechanism to verify the accuracy and/or genuineness of the answers. Using the DTS 140, the potential buyer may advantageously access a history of public records of the physical object 105.

In various implementations, using an access device, the DTS 140 may advantageously provide a remotely accessible digital object corresponding to details and records related to the physical object 105. In some implementations, the DTS 140 may, based on a location of the access device, the DTS 140 may automatically generate a display according to a locale setting of the location. For example, the DTS 140 may display currency and measurement based on whether the access device is in Indonesia or in the United States. In some implementations, in a cross-jurisdiction shipment, the DTS 140 may also generate labels and shipping documents based on a user's location.

Figure 2A:
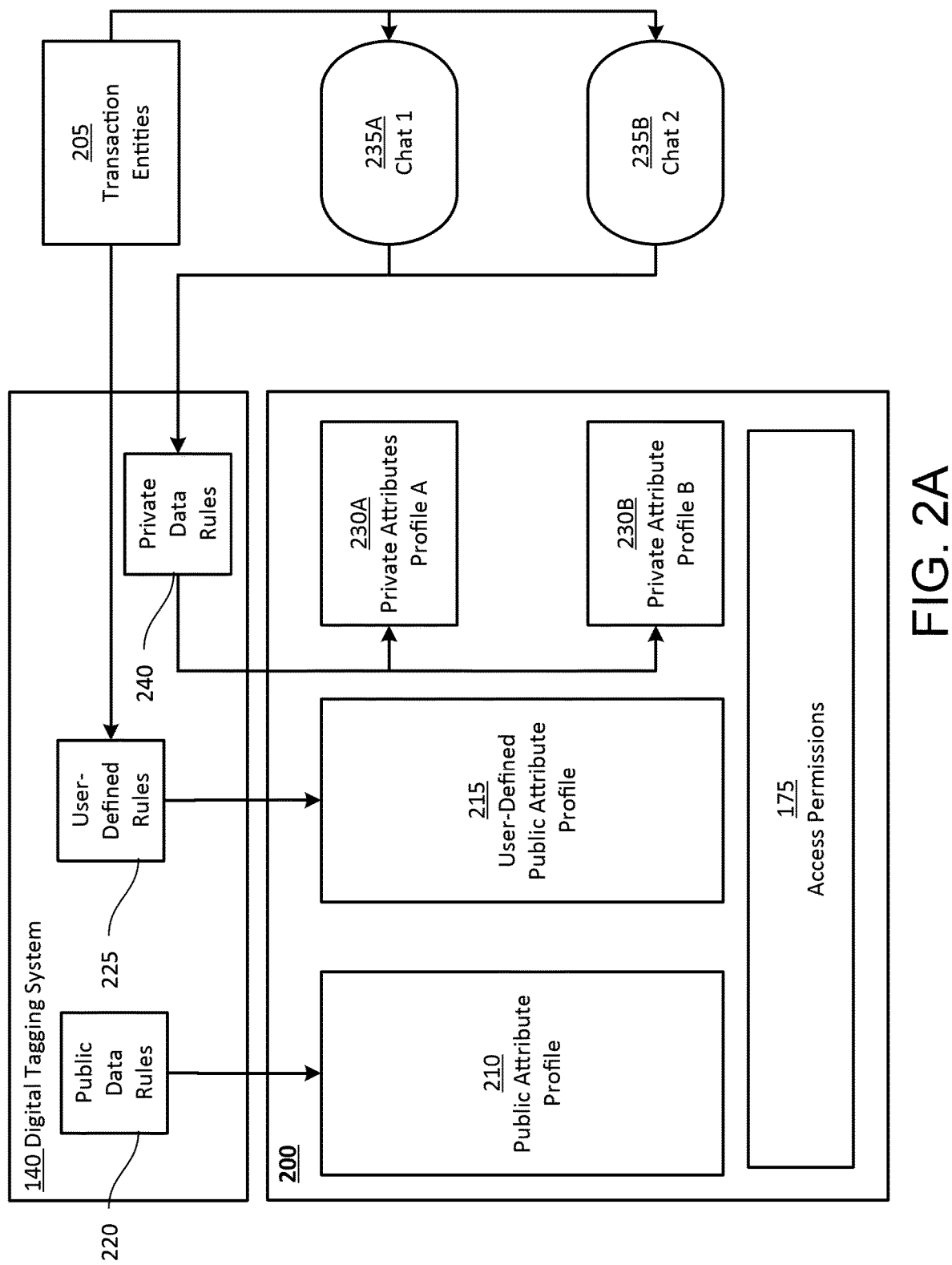
FIG. 2A is a block diagram depicting an exemplary data structure of a cumulative digital tag (CDT) associated with a physical object.

FIG. 2A is a block diagram depicting an exemplary digital transaction record (DTR 200) of a cumulative digital tag (e.g., the CDT 145) associated with a physical object (e.g., the physical object 105). For example, the DTR 200 may be one of the digital transaction records in the CDT 145. The DTR 200 includes transaction records between two or more transaction entities 205. For example, the DTS 140 may generate the DTR 200 when a transfer of procession is confirmed between the transaction entities 205. In some implementations, the CDT 145 may include a series of DTR. For example, the DTR 200 may be appended to the series of DTR when a transaction is confirmed.

The DTR 200 includes a public attribute profile 210 and a user-defined public attribute profile 215. For example, the DTS 140 may generate the public attribute profile 210 using public data rules. In some implementations, the public data rules 220 may specify that the production location and materials of the physical object 105 may be included in the public attribute profile 210. The user-defined public attribute profile 215, for example, may be generated based on user-defined public data rules 225. In some implementations, the user-defined public data rules 225 may be generated based on user input. Based on the user-defined rules, some information associated with the physical object (e.g., original color, material source, weight, dimensions) may be included in the user-defined public attributes.

The DTR 200 also includes two private attribute profiles 230A, 230B. As an illustrative example without limitation, the private attribute profile 230A is generated based on a chat 235A, and the private attribute profile 230B is generated based on a chat 235B. In some examples, the transaction entities 205 may select to upload the chats 235A, 235B to the DTS 140 be saved in the DTR 200. In this example, the DTS 140 includes private data rules 240. In some implementations, the private data rules 240 may determine that private messages between various transaction entities 205 may be accessible to, for example, only entitie7nvolvelved in the private messages (e.g., only participants in the chat 1 235A are allowed to access content of the private attribute profile 230A).

The access permissions 175, in some implementations, may be based on input from one or more of the transaction entities 205. As an illustrative example, when the designer 110 is collaborating with the maker 115, in some implementations, the designer 110 may transmit an input to define access permission of the DTR 200 (including both private data attributes and public data attributes). Exemplary operations and input for generating the access permissions are described in further details with reference to FIGS. 4A-4E.

In some implementations, the transaction entities 205 may initiate an update to the DTR 200 between a transaction of an origin party and a destination party. In some examples, the update may be generated based on an authorization of the destination party. In some examples, the update may be generated based on an authorization of the origin party. In some examples, the access permissions 175 may require an authorization signal from a current owner of the physical object.

In various implementations, the DTS 140 may update the DTR 200 linked to a single physical object when a signal is received from the transaction entities 205 to change in an attribute of the physical object. For example, the DTS 140 may generate, based on the public data rules 220, a corresponding public attribute profile associated with the change, including a date and location associated with a device of a party responsible for the change. Based on the user-defined public data rules 225, the DTS 140 may include additional information in the user-defined public attribute profile. Based on the private data rules 240, the DTS 140 may generate one or more private attribute profiles associated with the change. In some implementations, the DTS 140 may, as shown in FIG. 1, convert the public attribute profile and the private attribute profile into immutable data structures (remove editing rights from all entities). In various examples, when a link (e.g., an QR code) associated with the physical object is accessed and the updated DTR is retrieved, the public attribute profile is visible, but the private attribute profile is only visible when the predetermined access permissions are satisfied.

Figure 2B:
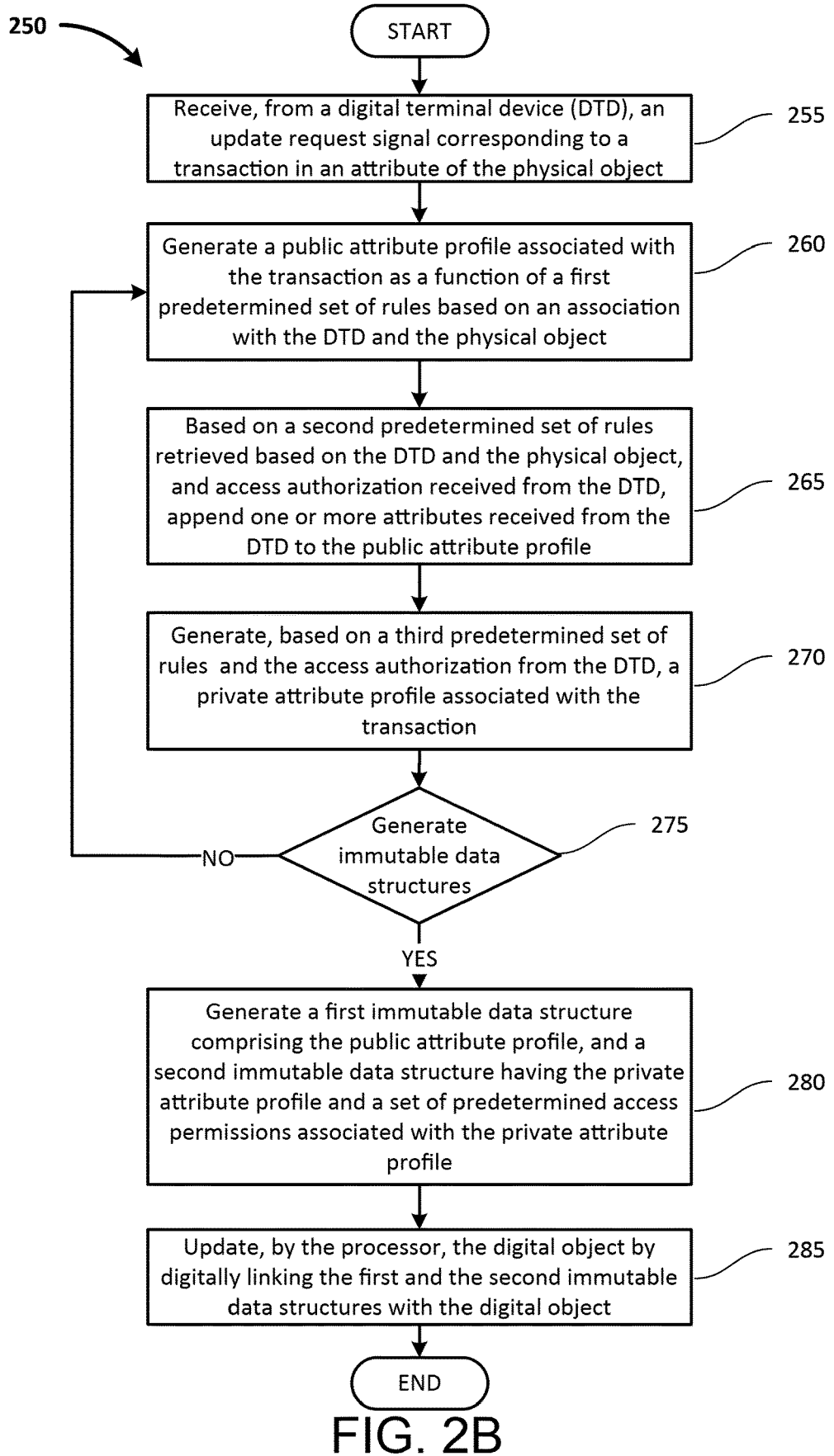
FIG. 2B is a flowchart illustrating an exemplary method to automatically associate private and public data of a transaction of a physical object with a uniquely-linked remotely accessible immutable digital object.

FIG. 2B is a flowchart illustrating an exemplary method 250 to automatically associate private and public data of a transaction of a physical object with a uniquely-linked remotely accessible immutable digital object. For example, the DTS 140 may generate the DTR 200 using the method 250. The method 250 begins when, from a digital terminal device (DTD), an update request signal corresponding to a transaction in an attribute of the physical object is received in step 255. For example, one of the transaction entities 205 may logon to the DTS 140 to update the DTR 200. In step 260, a public attribute profile associated with the transaction is generated as a function of a first predetermined set of rules based on an association with the DTD and the physical object. For example, the public attribute profile 210 may be generated based on the public data rules 220. In some implementations, the public data rules 220 may specify that basic information of a transaction may be included in the public attribute profile 210. For example, the basic information may include a current date and a current location associated with the digital terminal device that transmits the update request signal.

Next, in step 265, based on a second predetermined set of rules retrieved based on the DTD and the physical object, and access authorization received from the DTD, one or more attributes received from the DTD are appended to the public attribute profile. For example, the user defined public attribute profiles 215 may be updated based on the user-define rules 225 and the access permissions 175 of the DTR 200. In step 270, based on a third predetermined set of rules and the access authorization from the DTD, a private attribute profile associated with the transaction is generated. For example, the private attribute profile 230A or 230B may be generated based on the private data rules 240. Various illustrative embodiments for generation of the public attribute profiles and the private attribute profiles are described further with reference to FIGS. 5-6.

In a decision point 275, it is determined whether immutable data structures are generated. In some examples, the immutable data structures are generated when a transfer of ownership of the physical object is confirmed. Further discussion on the transfer of ownership is described with reference to FIG. 7. If it is determined that immutable data structures are not generated, the step 260 is repeated. If it is determined that immutable data structures are generated, in step 280, a first immutable data structure including the public attribute profile, and a second immutable data structure including the private attribute profile and a set of predetermined access permissions associated with the private attribute profile is generated. For example, edit access rights of the DTR 200 may be removed. In step 285, the digital object is updated by digitally linking the first and the second immutable data structures with the digital object, and the method 250 ends.

In some implementations, when a tag associated with a reference address of the digital object is scanned by an access device and the digital object are remotely retrieved, for each transaction, the public attribute profiles are accessible, but the private attribute profiles are restricted unless the set of predetermined access permissions corresponding to the private attribute profile are satisfied. Various embodiments for accessing the digital object using the reference address are described with reference to FIG. 8.

Figure 3:
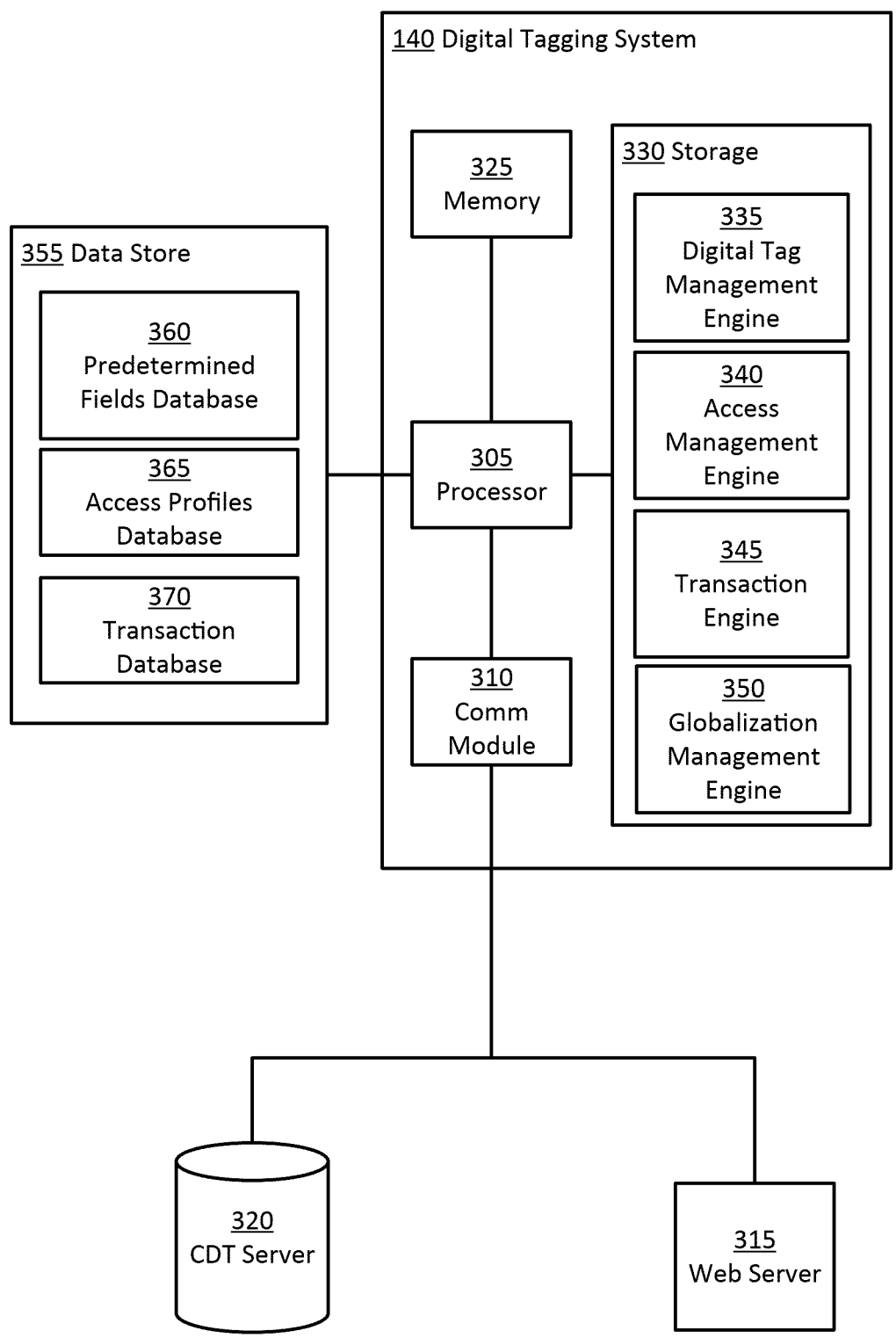
FIG. 3 is a block diagram depicting an exemplary digital tagging system.

FIG. 3 is a block diagram depicting an exemplary DTS 140. The DTS 140 includes a processor 305. The processor 305 may, for example, include one or more processing units. The processor 305 is operably coupled to a communication module 310. The communication module 310 may, for example, include wired communication. The communication module 310 may, for example, include wireless communication. In the depicted example, the communication module 310 is operably coupled to a web server 315 and a CDT Server 320. For example, the web server 315 may process access requests generated by an access device scanning a unique access image (e.g., a QR code). The CDT Server 320 may, for example, store the CDT generated by the DTS 140. In some examples, a requested CDT may be transmitted to the web server 315 from the CDT Server 320 for displaying at the access device. In some implementations, the CDT Server 320 may include an authentication processing engine to determine whether an access device is permitted to view the public attribute profiles 210, 215 and/or the private attribute profiles 230A, 230B, for example.

The processor 305 is operably coupled to a memory module 325. The memory module 325 may, for example, include one or more memory modules (e.g., random-access memory (RAM)). The processor 305 includes a storage module 330. The storage module 330 may, for example, include one or more storage modules (e.g., non-volatile memory). In the depicted example, the storage module 330 includes a digital tag management engine (DTME 335), an access management engine (AME 340), a transaction engine (TE 345), and a globalization management engine (GME 350).

The DTME 335, for example, may generate and update CDT to be stored in the CDT server 320. In some implementations, the DTME 335 may receive user input (via the web server) and generate DTR to update a CDT stored in the CDT server 320. The AME 340, for example, may determine whether input from an access device is authenticated to be updated to a CDT. For example, the AME 340 may check whether the designer 110 grants an access right to the maker 115 to update the CDT 145. In some implementations, the AME 340 may resolve conflict of authorizations. For example, when a user device does not have a right to change the private attribute profiles, then the AME 340 may allow the user device to edit the public attribute profiles based on the public data rules 220.

The TE 345 may, in some implementations, fetch and record information for each transaction in the DTS 140. For example, the TE 345 may fetch, for a transaction, a geolocation of a user device in the transaction. For example, the TE 345 may use the user device's IP address or Global Positioning System (GPS) coordinates to determine the geolocation of the user device.

In some implementations, the GME 350 may automatically generate synchronization data based on a user's location. For example, the user's location may be retrieved from the TE 345. In some implementations, the GME 350 may display price, regional event, weather, and/or other shipping/legal requirements based on the user's location. For example, the DTS 140 may, upon determining a difference in currency of two transaction parties, use the GME 350 to show a current exchange rate between the currencies used by the two transaction parties. For example, if a price of the physical object is entered in Indonesian rupiah by a vendor in Indonesia, the GME 350 may generate a US dollar amounts according to an exchange rate at, for example, the date the price is entered, ex-factory date, shipment date, or the date when money is transferred. In some implementations, if an entered date is a day of importance for any of the transaction parties, the GME 350 may flag the date for other transaction parties. For example, when a designer in the United States requesting a shipment from a factory in Indonesia on Lunar New Year Day, the GME 350 may notify the designer that the requested shipment date may have a schedule issue as the date is an Indonesian holiday. In some implementations, the GME 350 may retrieve, from various database (e.g., news sources), major events (e.g., demonstrations, pandemics, severe weather situation, financial crisis, political unrest) that might interfere with business and/or delivery based on location of the transaction parties. In some implementations, the GME 350 may convert measurement units (e.g., from centimeters to inches) based on location of the transaction parties.

The processor 305 is further operably coupled to the data store 355. The data store 355, as depicted, includes a predetermined fields database 360, an access profiles database 365, and a transaction database 370. The predetermined fields database 360, in some implementations, includes a predetermined list of fields available to transaction parties' input. For example, the DTS 140 may display the predetermined list of fields for input when a user is updating the CDT 145. The access profile database 365 may include associations between an access right of each of the predetermined field with respect to a user identification. Based on the associations, the AME 340, for example, may determine whether a user device is applicable to update a specific field. The transaction database 370 may include a list of transactions occurred for each physical object registered in the DTS 140. For each transaction, in some implementations, the DTS 140 may record the geolocation of a user device associated with the transaction.

Figures 4A, 4B:
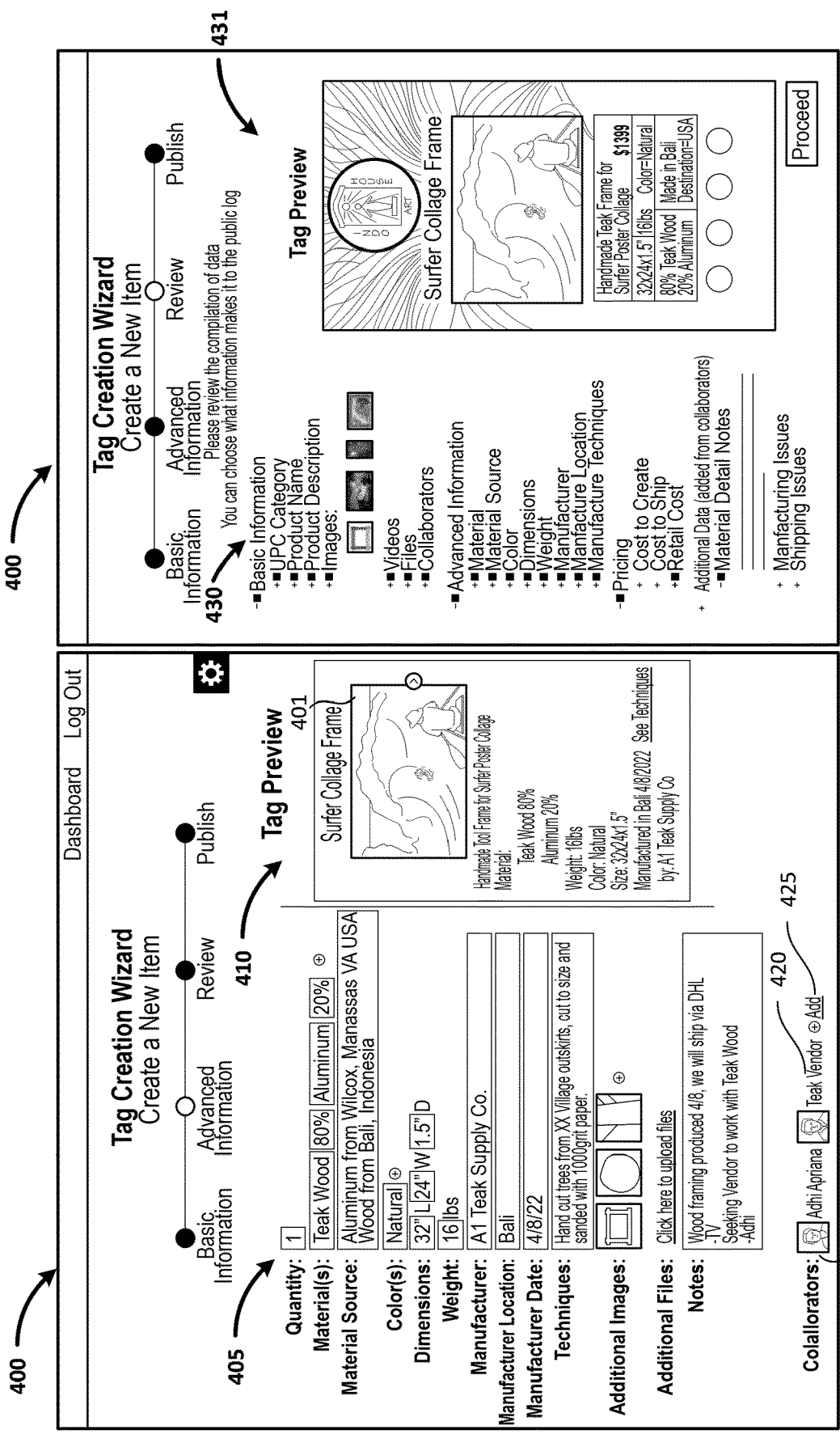

FIG. 4A, FIG. 4B, FIG. 4C, FIG. 4D, and FIG. 4E depict exemplary graphic user interfaces (GUI) to manage an exemplary cumulative digital tag associated with a physical object. As shown in FIG. 4A, the GUI includes a tag creation wizard (TCW 400). For example, a user may use the TCW 400 to create a CDT 145 for a product (e.g., a picture frame). The TCW 400 includes a product details section 405, and a preview section 410. As shown, in the production detail section 405, product details including quantity, materials used, material sources, dimensions, weights, color, a manufacturer name, a manufacturer location, and manufacturing techniques can be entered. For example, additional images, videos, and files associated with the physical object can be uploaded. The product detail section 405 further includes remarks/note input for providing additional explanation or information related to the physical object.

The preview section 410, in this example, includes an image of the physical object. In this example, the physical object is a surfer collage frame 401. In some implementations, the preview section 410 may be dynamically generated based on information entered in the product detail section 405. As shown in FIG. 4A, there are two collaborators 415, 420 (e.g., a maker and a vendor of the surfer collage frame 401), to create a CDT of the surfer collage frame 401. Additional collaborators may be added using an add button 425.

After the product details section 405 is completed, in some implementations, an owner of the physical object may select a proceed button (not shown) to confirm a public attribute profile for the surfer collage frame 401. As shown in FIG. 4B, the TCW 400 includes an access permission checklist 430. Using the access permission checklist 430, a user (e.g., the owner) may select one or more fields in the product detail section 405 to be published. In this example, it is selected that a cost to create and a cost to ship are removed from the public attribute profile. For example, the DTS 140 may generate the access permissions 175 for the DTS of the surfer collage frame 401 that the cost to create and the cost to ship may not be accessible to the public. As shown in FIG. 4B, a dynamic tag preview 431 may be generated based on current user selections.

Figure 4C:
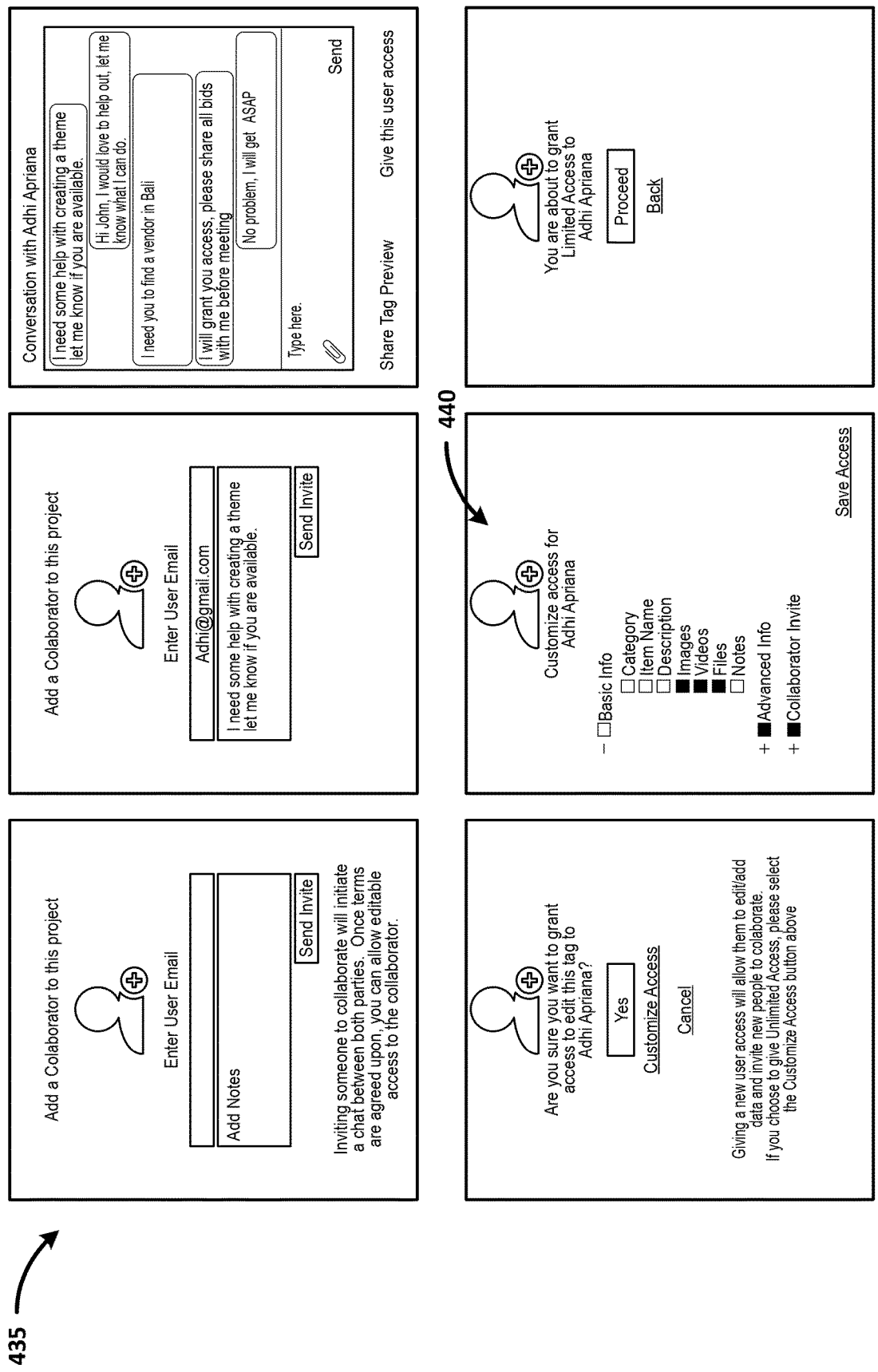

Upon selecting the add button 425, the TCW 400 may generate GUIs 435 as shown in FIG. 4C to add a collaborator to associate with the surfer collage frame 401. As shown, a user may add a collaborator by adding an email address of a new collaborator, upload relevant conversation details with the new collaborator, and grant access rights to the new collaborator using an access right checklist 440.

Figure 4D:
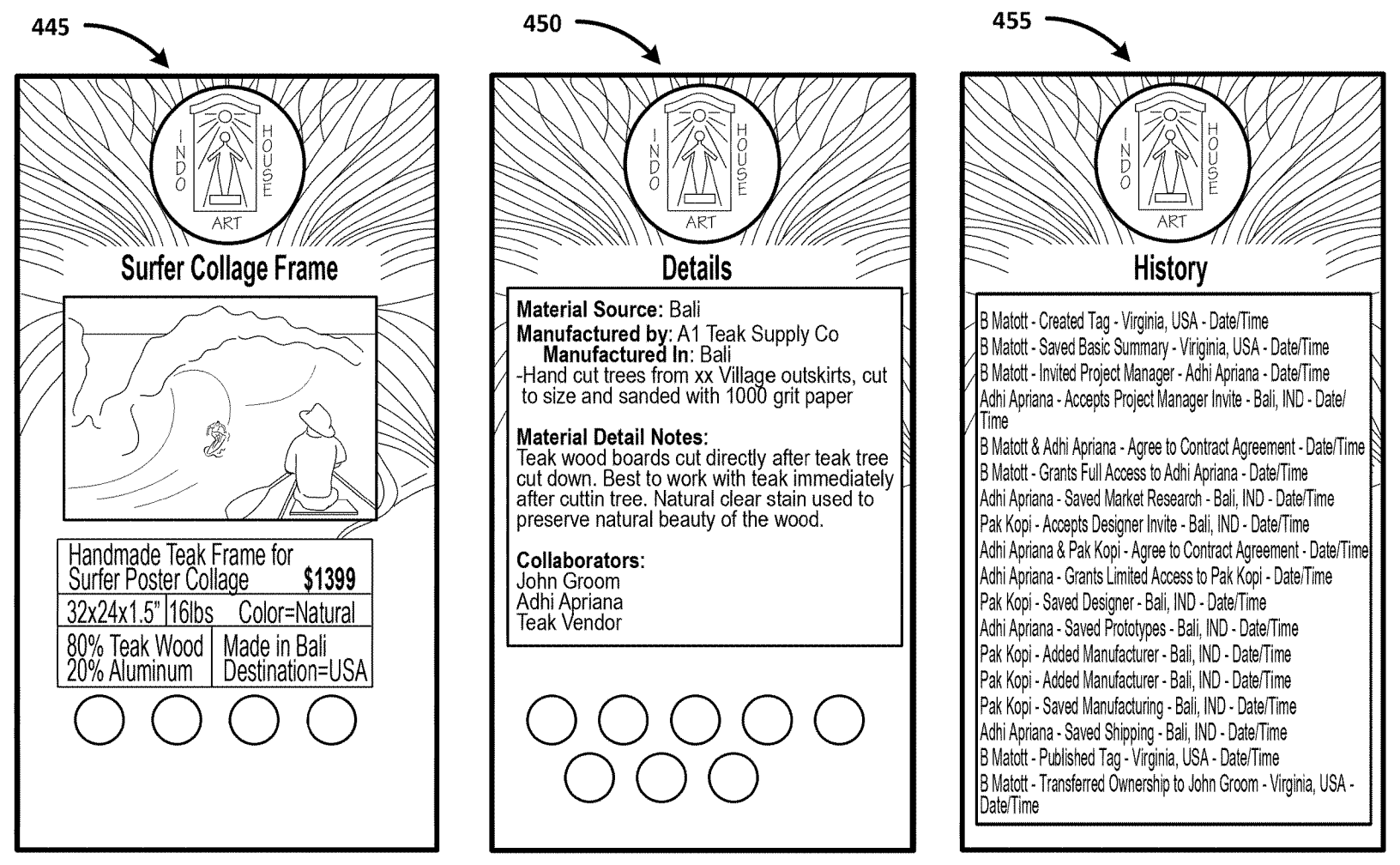

Once a CDT is created, the CDT may be accessible remotely by a unique link. For example, the unique link may be a QR code. For example, after accessing the unique link, an accessible device may receive a public view including a public product attribute profile of the physical object. As shown in FIG. 4D, three sections of public attribute profile of the surfer collage frame 401 are depicted. As an illustrative example, the public attribute profile includes a basic details section 445, an advance details section 450, and a product history section 455.

Figure 4E:
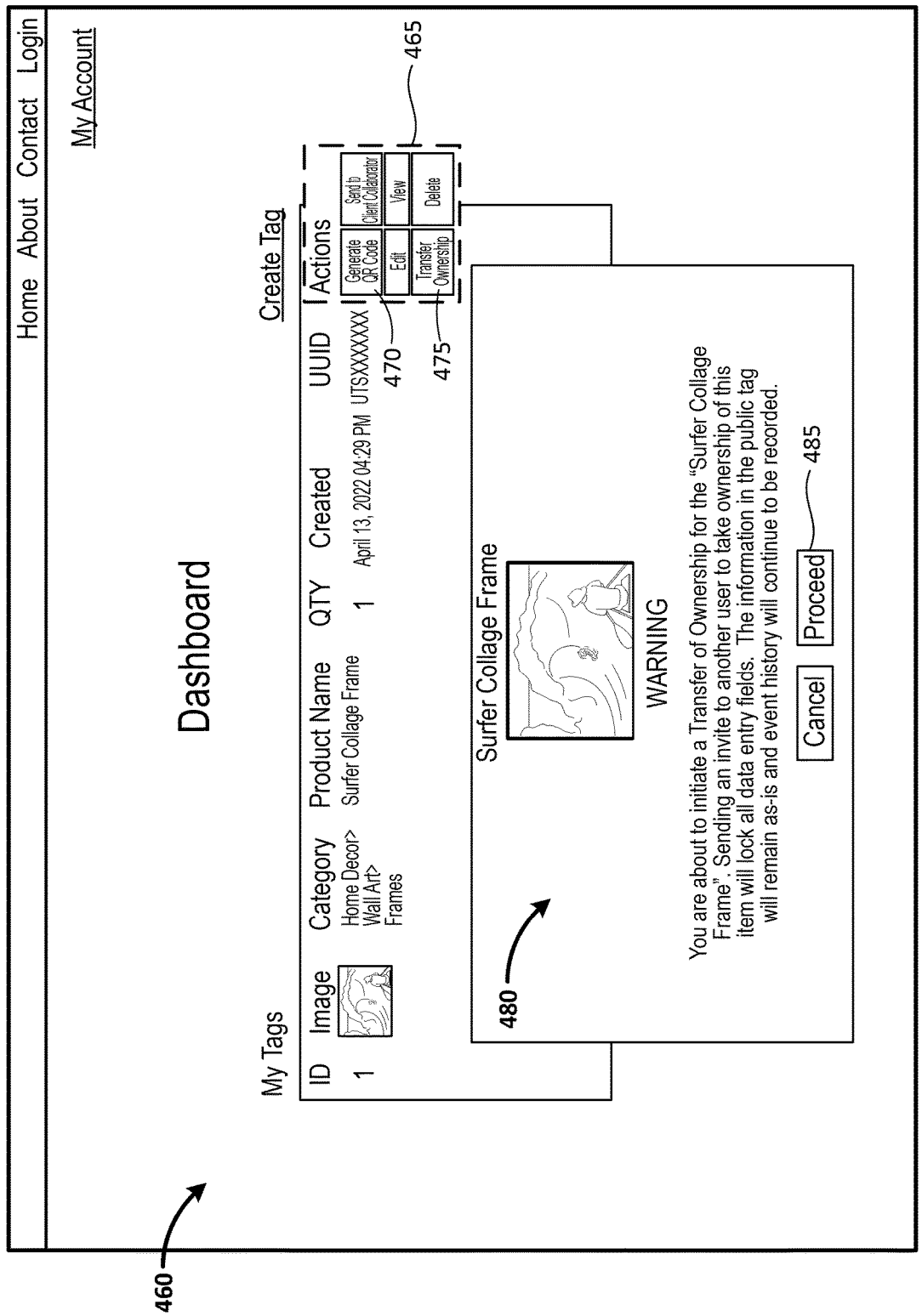

FIG. 4E shows a dashboard 460 of a CDT. For example, the dashboard 460 may be generated after the CDT of the surfer collage frame 401 is created. As shown, the dashboard 460 includes an action pane 465 for the CDT. The action pane 465 includes a button 470 for generating QR code for accessing the CDT, and a button 475 for transferring ownership. Upon the button 470 is selected, for example, the DTS 140 may generate a QR code corresponding to a unique link for remotely accessing the public attribute profiles (e.g., the public attribute profile 210 and the user-defined public attribute profile 215). Upon the button 475 is selected, for example, the DTS 140 may transfer an ownership of the physical object (e.g., the surfer collage frame 401) to a selected user. For example, the selected user may be invited by a current owner of the physical object by sending an invitation link to be registered in the DTS 140. In this example, a warning 480 is displayed after a current owner selected the button for transferring ownership. As stated in a warning 480 in the depicted example, when the current owner selects a proceed button 485, the DTS 140 may lock all fields in the CDT so that both the public attribute profile and the private attribute profile of the CDT of the surfer collage frame 401 may become immutable.

Figure 5:
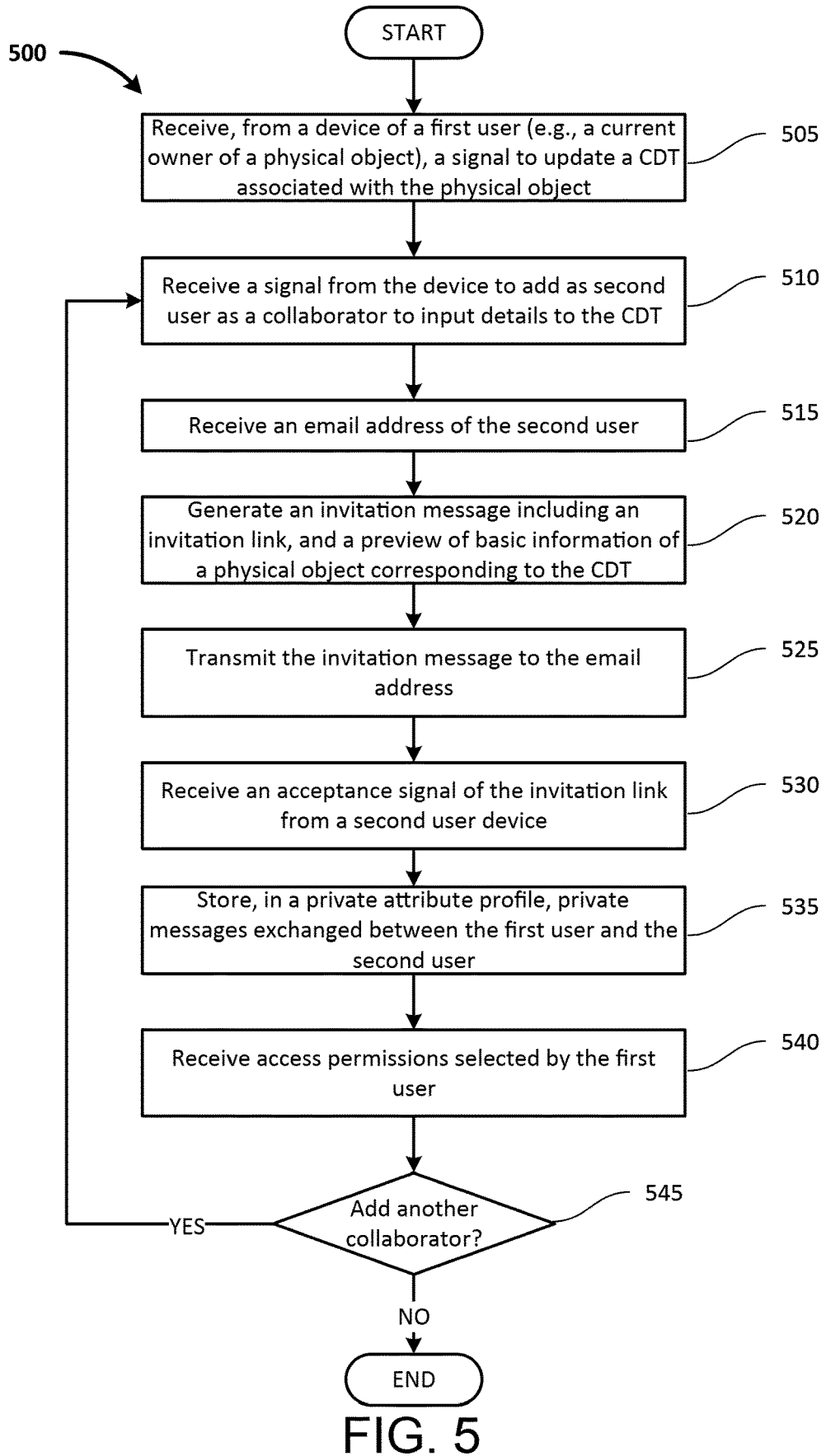
FIG. 5 is a flowchart illustrating an exemplary method of adding a collaborator to an exemplary CDT.

FIG. 5 is a flowchart illustrating an exemplary method of adding a collaborator to an exemplary CDT. In some implementations, the DTS 140 may receive cumulative data from multiple collaborators. For example, the AME 340 may perform the method 500 to allow an administrative user of a CDT 145 to grant edit access permissions to additional users to provide product details. For example, the DTS 140 may selectively differentiate the received data from different collaborators as private attribute or public attribute based on access permissions selected by an admin user (e.g., an owner, an administrative user).

The method 500 begins when a signal is received from a device of a first user (e.g., a current owner of a physical object) to update a CDT associated with the physical object in step 505. Next, in step 510, a signal is received from the device to add a second user as a collaborator to input details to the CDT. For example, the add button 425 is selected. In step 515, an email address of the second user is received. After receiving the email address, an invitation message including an invitation link, and a preview of basic information of a physical object corresponding to the CDT is generated in step 520. For example, the basic information may include an image, a title, and/or a description of the physical object. In step 525, the invitation message is transmitted to the email address. In some implementations, other contact channels may be used. For example, a phone number of the second user may be used. For example, the invitation message including the invitation link may be transmitted to the second user via text messages with Short Message Service (SMS) or other messaging mobile apps.

In step 530, an acceptance signal of the invitation link is received from a second user device. For example, the second user may select the invitation link and logon to the DTS 140 using a mobile device. After receiving the acceptance signal, in step 535, private messages exchanged between the first user and the second user are stored in a private attribute profile. In step 540, access permissions selected by the first user are received. For example, the first user may use the access right checklist 440 as described with reference to FIG. 4C to selectively grant edit access rights to the second user. In a decision point 545, it is determined whether another collaborator is to be added. If another collaborator is to be added, the step 510 is repeated. If another collaborator is not to be added, the method 500 ends.

Figure 6:
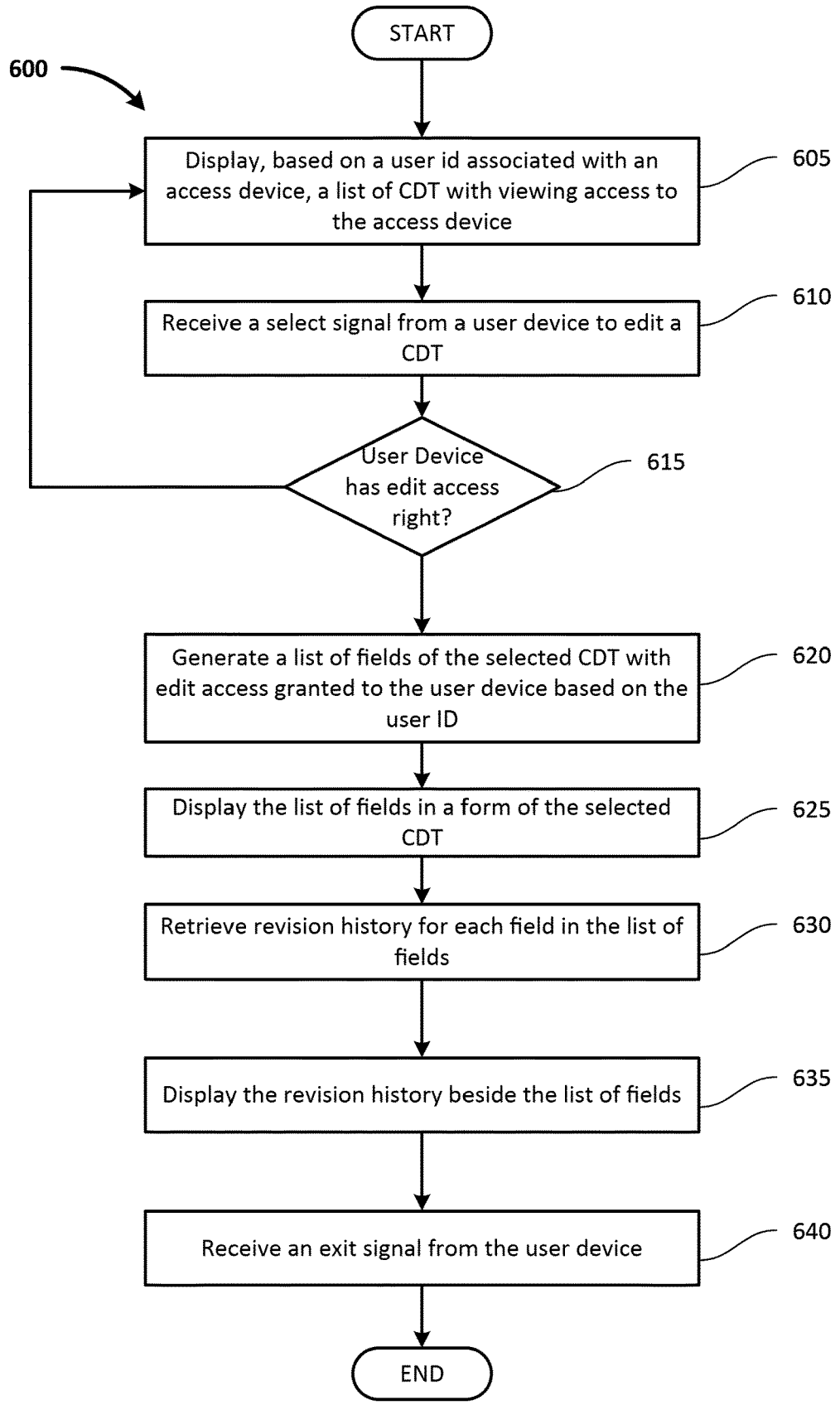
FIG. 6 is a flowchart illustrating an exemplary edit access authentication method of an exemplary CDT.

FIG. 6 is a flowchart illustrating an exemplary edit access authentication method of an exemplary CDT. For example, the AME 340 may authenticate a user to edit the CDT 145 based on credentials (e.g., user id) of the user. The method 600 begins in step 605 when, based on a user ID associated with an access device, a list of CDTs with viewing access to the access device is displayed. For example, the AME 340 may retrieve from the access profiles database 365 a list of product IDs that the user has viewing access. Based on the product ID, for example, the DTS 140 may display CDTs corresponding to the list of product ID for the user's selection.

In step 610, a select signal is received from a user device to edit a CDT. In a decision point 615, it is determined whether the user device has an edit access right to the selected CDT. For example, the AME 340 may retrieve from the access permissions 175 of the CDT 145, a list of user ID with edit access right to the CDT. If it is determined that the user device does not have an edit access right to the selected CDT, the step 605 is repeated. If it is determined that the user device has an edit access right to the selected CDT, a list of fields of the selected CDT with edit access granted to the user device based on the user ID is generated in step 620. Next, the list of fields in a form of the selected CDT is displayed in step 625. In step 630, revision history is retrieved for each field in the list of fields. In step 635, the revision history is displayed beside the list of fields. For example, the revision history may be displayed when the user is entering information at the fields. For example, the revision history may be displayed statically in the form. In step 640, an exit signal from the user device is received, and the method 600 ends.

Figure 7:
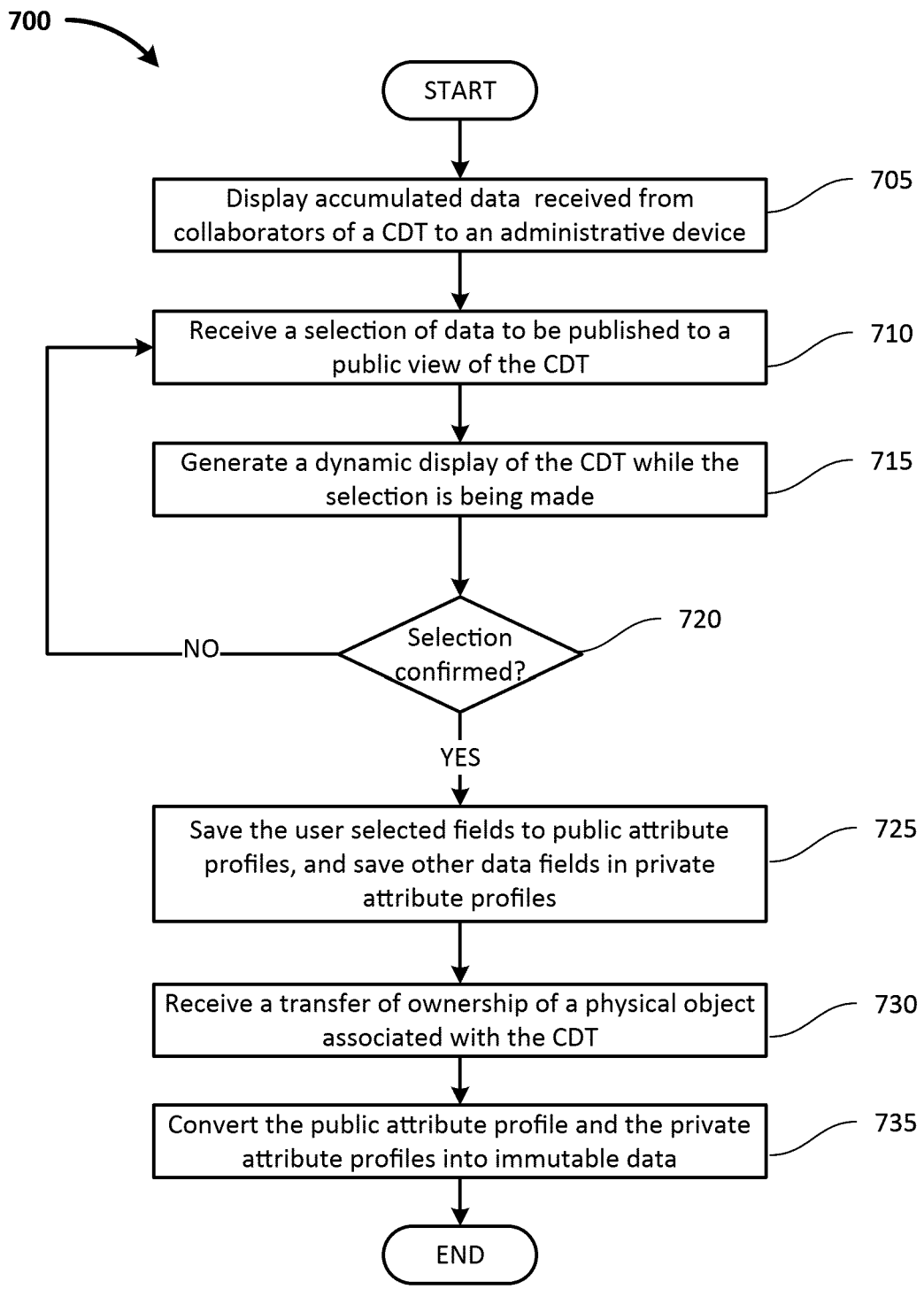
FIG. 7 is a flowchart illustrating an exemplary publication method of an exemplary CDT.

FIG. 7 is a flowchart illustrating an exemplary publication method 700 of an exemplary CDT. The method 700 begins when accumulated data received from collaborators of a CDT to an administrative device is displayed in step 705. For example, a user may review the TCW 400 to review the accumulated data from the collaborators 415, 420. In step 710, a selection of data to be published to a public view of the CDT is received. For example, a user may select, on the access permission checklist 430, one or more data fields to be published to the public view of the CDT.

Next, a dynamic display of the CDT is generated while the selection is being made in step 715. For example, the user may review the selection using the dynamic tag preview 431. In a decision point 720, it is determined whether the selections are confirmed. For example, the user may select a proceed button to confirm the selections. If it is determined that the user selection is not confirmed, the step 710 is repeated. If it is determined that the user selection is confirmed, the user selected fields are saved to public attribute profiles, and other data fields are saved to private attribute profiles in step 725. In step 730, a transfer of ownership of a physical object associated with the CDT is received. For example, an owner of the surfer collage frame may sell the frame to a buyer. Next, in step 735, the public attribute profile and the private attribute profiles are converted into immutable data and the method 700 ends.

Figure 8:
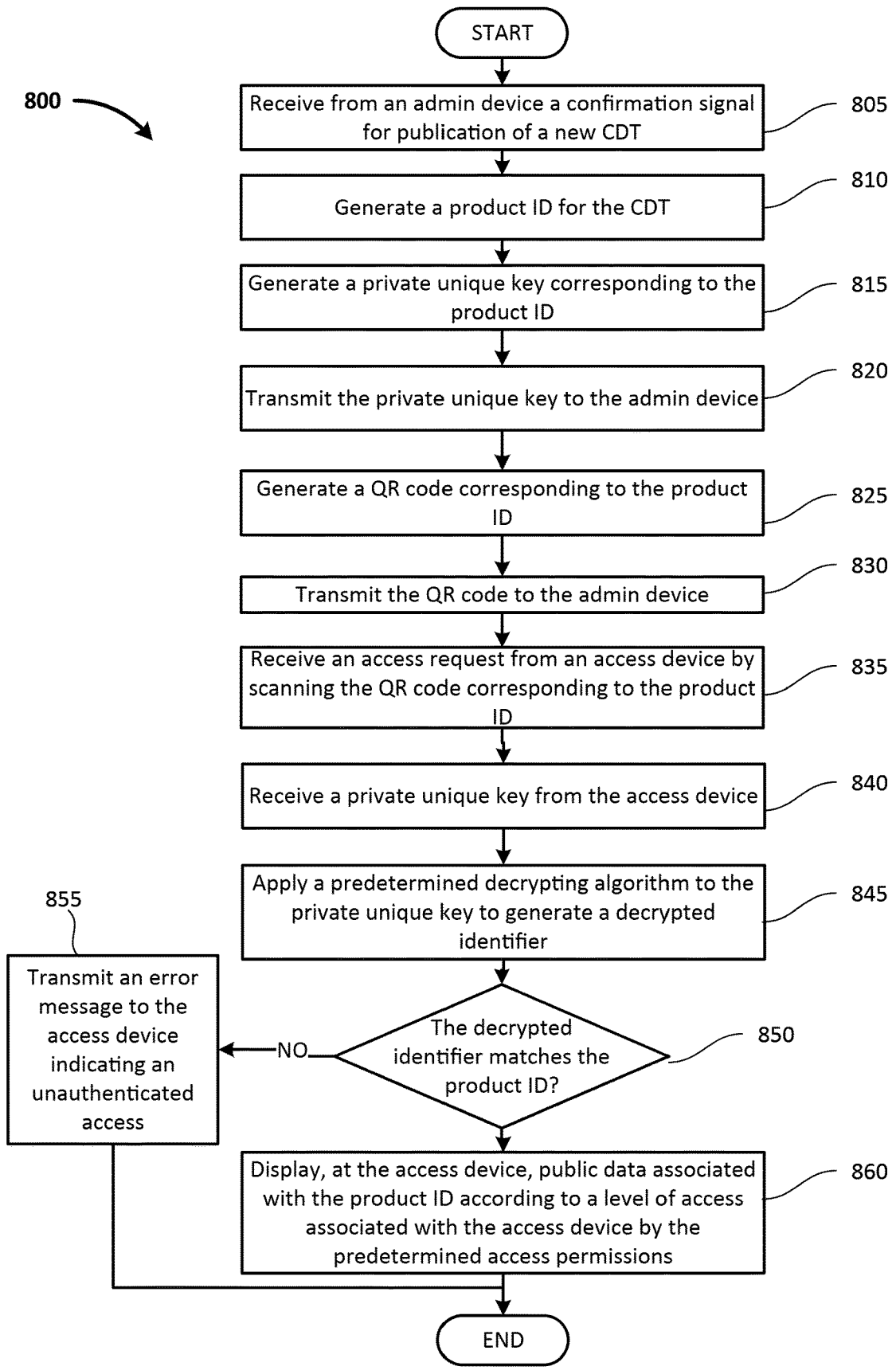
FIG. 8 is a flowchart illustrating an exemplary product authentication method of an exemplary CDT.

FIG. 8 is a flowchart illustrating an exemplary product authentication method 800 of an exemplary CDT. For example, the DTS 140 may use the method 800 to authenticate access to a public view of a CDT. The method 800 begins when, from an admin device, a confirmation signal for publication of a new CDT is received in step 805. Next, in step 810, a product ID is generated for the CDT. In some implementations, the product ID may be a character string. For example, the product ID may be 21 char long. For example, the product ID may be 41 char long.

In step 815, a private unique key is generated corresponding to the product ID. In some implementations, the private key may be generated using an encryption algorithm (e.g., RSA). In some examples, the private key may be 2048 char long. In some examples, the private key may be 1024 char long. In some examples, the private key may be 4096 char long.

After the private unique key is generated, the private unique key is transmitted to the admin device in step 820. In step 825, a QR code is generated corresponding to the product ID. For example, the QR code may include the product ID. In step 830, the QR code is transmitted to the admin device. For example, a user of the admin device may print the QR code on a tag or on a coin.

In step 835, an access request is received from an access device by scanning the QR code corresponding to the product ID. In some implementations, the access device may send the access request by directly using a unique link of the product ID. Next, in step 840, a private unique key of the product ID is received from the access device. For example, the private unique key may be transmitted to the access device from the admin device. For example, the access device may transmit the private unique key with the access request. In some implementations, the DTS 140 may send a request to the admin device to confirm the access request. If the access request is confirmed, the admin device may transmit the private unique key to the DTS 140.

After the private unique key is received, in step 845, a predetermined decrypting algorithm is applied to the private unique key to generate a decrypted identifier. For example, the AME 340 may include a decrypting algorithm to generate the decrypted identifier. In a decision point 850, it is determined whether the decrypted identifier matches the product ID. If it is determined that the decrypted identifier does not match the product ID, in step 855, an error message is transmitted to the access device indicating an unauthenticated access. If it is determined that the decrypted identifier does not match the product ID, public data (e.g., the public attribute profiles 210, 215) associated with the product ID is displayed according to a level of access associated with the access device by the predetermined access permissions in step 860, and the method 800 ends.

Figure 9A:
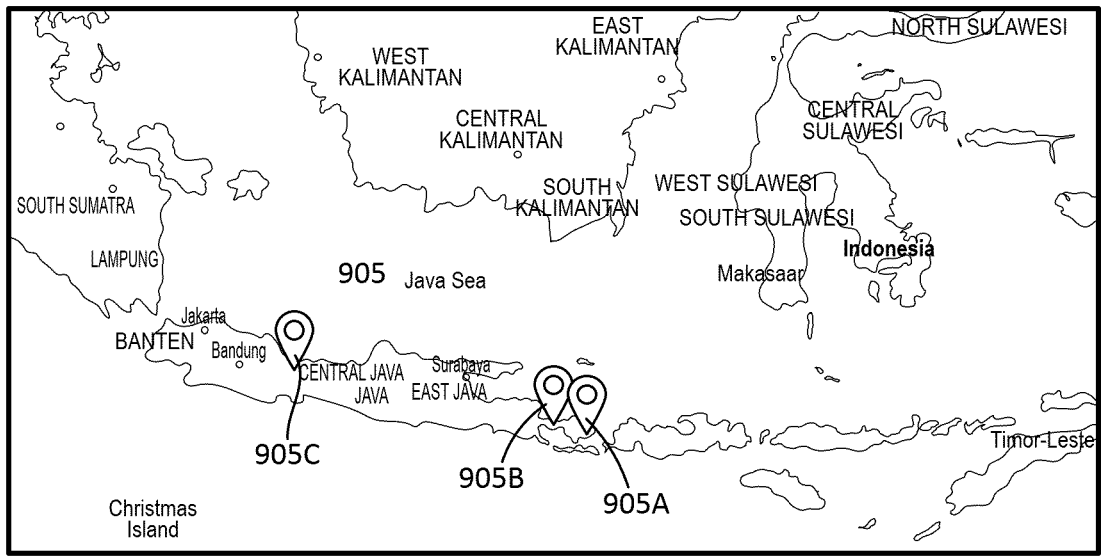
FIG. 9A and FIG. 9B depict exemplary GUI for displaying geographical information of a physical object associated with an exemplary CDT.
Figure 9B:
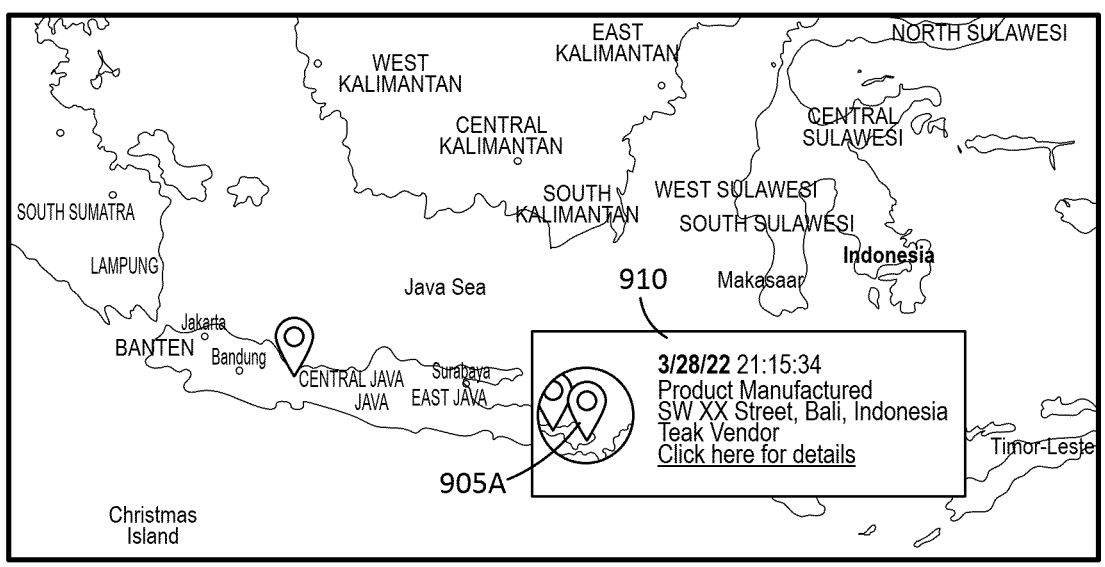

FIG. 9A and FIG. 9B depict exemplary GUI 900 for displaying geographical information of a physical object associated with an exemplary CDT. As shown in FIG. 9A, the GUI 900 includes a world map. Pointers 905 are placed in the world map at coordinates corresponding to location of transactions related to the physical object. For example, the physical object may be manufactured at a location associated with the pointer 905A, designed in a location associated with the pointer 905B, and shipped at a location associated with the pointer 905C.

A user may select any of the pointers 905 to view additional information of the selected pointer. As shown in FIG. 9B, the pointer 905A is selected, and an information area 910 is displayed. As an illustrative example, the information area 910 may display information from the public attribute profile 210. In this example, a timestamp, a description, and a location associated with a transaction represented by the pointer 905A are displayed. In various examples, the DTS 140 may advantageously generate, based on changes stored in the transaction database 370 associated with the CDT 145, a graphical user interface displaying a location of each of the changes. In some examples, the GUI 900 may show a chronicled chain of transactions associated with a physical object. For example, the chronological display may advantageously improve integrity and authenticity of the physical object.

Figure 10:
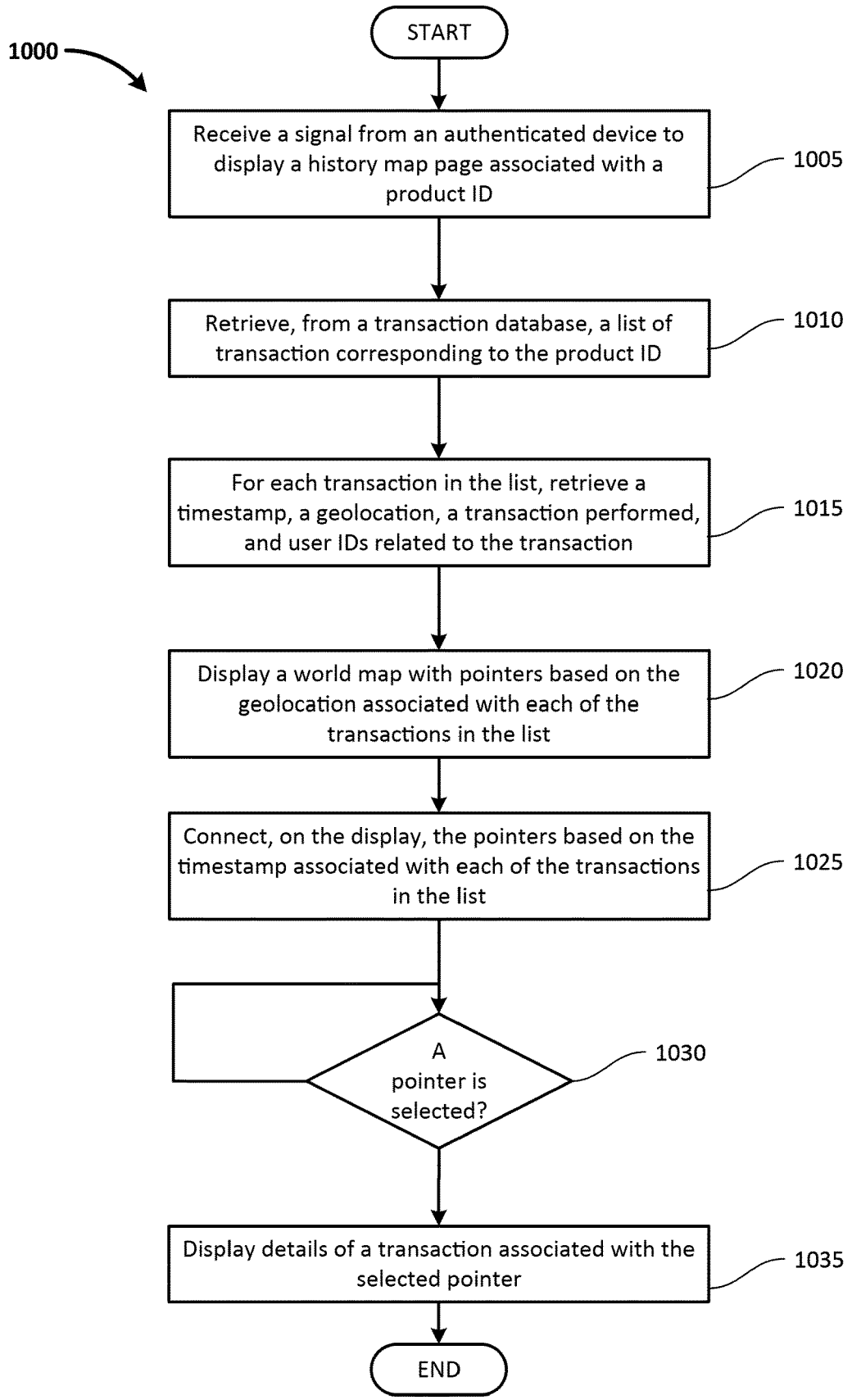
FIG. 10 is a flowchart illustrating an exemplary geographical history retrieval method.

FIG. 10 is a flowchart illustrating an exemplary geographical history retrieval method 1000. For example, the DTS 140 may perform the method 1000 to generate the GUI 900 as described with reference to FIGS. 9A-9B. The method 1000 begins when a signal is received from an authenticated device to display a history map page associated with a product ID in step 1005.

Next, in step 1010, from a transaction database, a list of transactions is retrieved corresponding to the product ID. For example, a list of transactions corresponding to a product ID may be retrieved from the transaction database 370. After the list of transactions is retrieved, for each transaction in the list, in step 1015, a timestamp, a geolocation, a transaction performed, and user IDs related to the transaction is retrieved. In various examples, a transaction may be a buy-sell transaction. In some examples, a transaction may be a service provided or other actions collaborating in developing or servicing a physical object associated with the product ID.

In step 1020, a world map is displayed with pointers based on the geolocation associated with each of the transactions in the list. For example, the pointers 905 may be displayed on the world map in the GUI 900. Next, on the display, the pointers are connected based on the timestamp associated with each of the transactions in the list in step 1025. In a decision point 1030, it is determined whether a pointer is selected. If no pointer is selected, the step 1025 is performed. If a pointer is selected, in step 1035, details of a transaction associated with the selected pointer is displayed. For example, the information area 910 is displayed with details associated with the selected pointer 905A. And the method 1000 ends.

Figure 11:
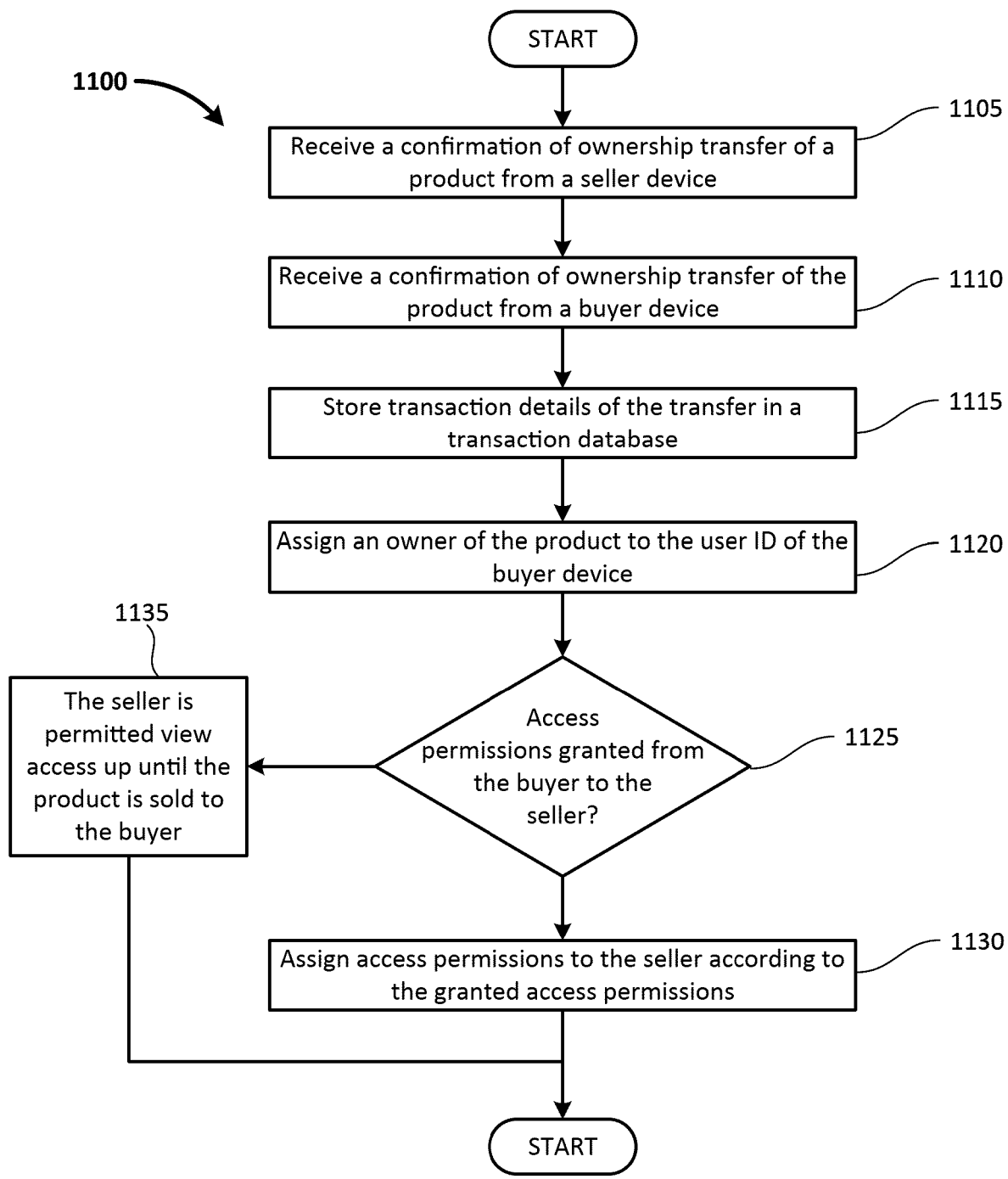
FIG. 11 is a flowchart illustrating an exemplary ownership transfer method.

FIG. 11 is a flowchart illustrating an exemplary ownership transfer method 1100. For example, the DTME 335 may perform the method 1100 when a transfer of ownership is initiated by a user. In this example, the method 1100 begins in step 1105 when a confirmation of ownership transfer of a product is received from a seller device. Next, a confirmation of ownership transfer of the product is received from a buyer device in step 1110. For example, the confirmations may be received independently from separate devices when the buyer and the seller both logon to their user accounts using their respective terminal devices (e.g., mobile phone, personal computers).

In step 1115, transaction details of the transfer are stored in a transaction database. For example, the TE 345 may store a timestamp, locations of the seller device and the buyer device, price of the sale, payment terms, and/or ship mode of the transaction. For example, the details may be stored in the transaction database 370. In step 1120, an owner of the product is assigned to the user ID of the buyer device.

In a decision point 1125, it is determined whether access permissions are granted from the buyer to the seller. If it is determined that access permissions are granted from the buyer to the seller, in step 1130, access permissions are assigned to the seller according to the granted access permissions, and the method 1100 ends. For example, the AME 340 may assign the access permissions to the seller according to input from the buyer device.

If it is determined that access permissions are not granted from the buyer to the seller, the seller is permitted view access up until the product is sold to the buyer in step 1135, and the method 1100 ends.

Figure 12:
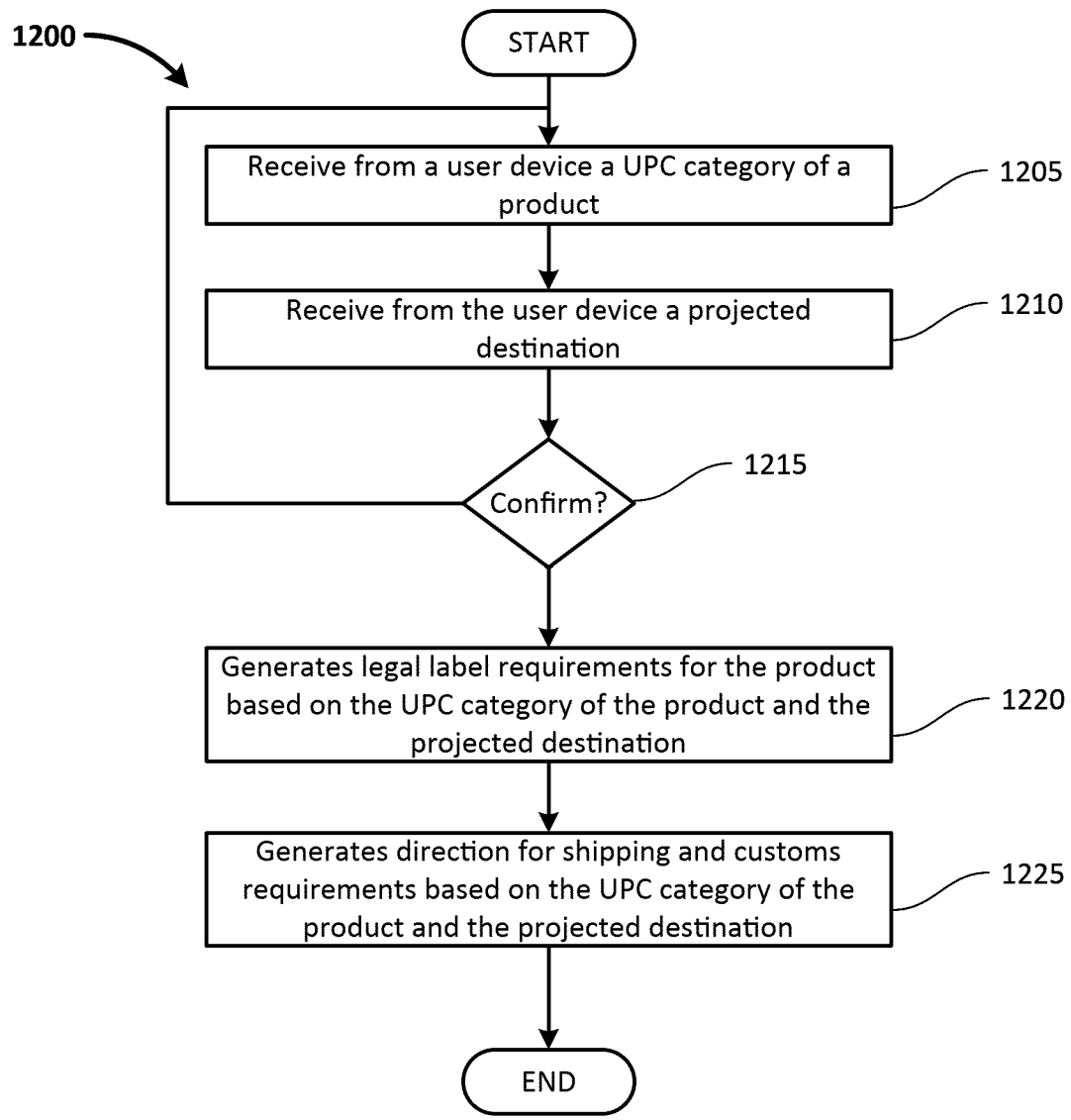
FIG. 12 is a flowchart illustrating an exemplary shipment creation method using an exemplary cumulative digital tag.

FIG. 12 is a flowchart illustrating an exemplary shipment creation method 1200 using an exemplary cumulative digital tag. In some implementations, the GME 350 may perform the method 1200 to synchronize transactions between two or more global partners across, for example, different jurisdictions. In various implementations, when a transaction is associated with a cross-jurisdiction transaction, the GME 350 may retrieve, for example, product labeling requirements of a target jurisdiction for the physical object based on predetermined attributes retrieved from the digital object.

The method 1200 begins when a UPC category of a product is received from a user device in step 1205. For example, a user may associate a UPC category to a CDT 145 corresponding to the product using the TCW 400. In step 1210, a projected destination is received from the user device. In a decision point 1215, it is determined whether a confirmation is received for the UPC category and the projected destination. If it is determined that a confirmation is not received, the step 1205 is repeated. If it is determined that a confirmation is received, in step 1220, legal label requirements are generated for the product based on the UPC category of the product and the projected destination. Next, in step 1225, directions for shipping and customs requirements are generated based on the UPC category of the product and the projected destination, and the method 1200 ends.

FIG. 13 depicts an exemplary machine learning engine for tag suggestion(s) injection. A tag suggestions injection engine 1300 includes a machine learning model. The machine learning model may, by way of example and not limitation, include a neural network model. The neural network model may include, for example, recurrent neural network (RNN) and/or deep neural network (DNN). The machine learning model may, for example, include an ensemble model. Different neural network models may be selected. The number of the model layers (e.g., the hidden neurons) may also be determined based on, for example, the complexity of content descriptions and/or attributes. In some implementations, the machine learning model may, for example, include a classifier(s).

The tag suggestions injection engine 1300 may, for example, be implemented in the DTS 140. The tag suggestions injection engine 1300 may, for example, receive (e.g., input data) and/or transmit (e.g., outputs, such as in response to inputs) from various engines such as, by way of example and not limitation, the DTME 335, the AME 340, the TE 345, and/or the GME 350. The tag suggestions injection engine 1300 may, for example, retrieve data from the data store 355 (e.g., the predetermined fields database 360, the access profiles database 365, the transaction database 370). The tag suggestions injection engine 1300 may, for example, retrieve data from the CDT server 320 and/or the web server 315.

A set of training data is applied to the tag suggestions injection engine 1300 to train the machine learning model. The training data includes a set of training input data 1305 and a set of training output data 1310. The set of training input data 1305 may include, by way of example and not limitation, historical input data and/or rules from various parties (e.g., buyers, sellers, creators) such as, by way of example and not limitation, the designer 110, the maker 115, the merchandizing entity 120, the first buyer 125, and/or the second buyer 130. The set of training input data 1305 may include, by way of example and not limitation, access permissions 175, public immutable data 165, and/or private immutable data 170. The set of training input data may, for example, include the public data rules 220, the user-defined public data rules 225, the private data rules 240, historical public attribute profile 210, historical user-defined public attribute profile 215, historical private attribute profiles (e.g., private attribute profile 230A, private attribute profile 230B), historical transactions and/or associated entity data (e.g., transaction entities 205), and/or historical chat data (e.g., chat 235A, chat 235B). The training input data 1305 may, by way of example and not limitation, be retrieved from the predetermined fields database 360, the access profiles database 365, the transaction database 370, and/or the CDT 320.

The set of training output data 1310 may include historical predetermined attributes, events, and/or actions. The training output data 1310 may, for example, be selected to correspond to the training input data 1305. The set of training output data 1310 may include, by way of example and not limitation, historical associated data and/or rules from various parties (e.g., buyers, sellers, creators) such as, by way of example and not limitation, the designer 110, the maker 115, the merchandizing entity 120, the first buyer 125, and/or the second buyer 130. The set of training output data 1310 may include, by way of example and not limitation, access permissions 175, public immutable data 165, and/or private immutable data 170. The set of training input data may, for example, include the public data rules 220, the user-defined public data rules 225, the private data rules 240, historical public attribute profile 210, historical user-defined public attribute profile 215, historical private attribute profiles (e.g., private attribute profile 230A, private attribute profile 230B), historical transactions and/or associated entity data (e.g., transaction entities 205), and/or historical chat data (e.g., chat 235A, chat 235B). The training output data 1310 may, by way of example and not limitation, be retrieved from the predetermined fields database 360, the access profiles database 365, the transaction database 370, and/or the CDT 320.

As an illustrative example, training input data may, by way of example and not limitation, include attributes and/or locations of users. Corresponding training output data may, for example, include a type of product and/or attributes of products created by users.

As an illustrative example, training input data may, by way of example and not limitation, include a predetermined template (e.g., as selected and/or used by users). Corresponding training output data may, for example, include one or more changes made to the template by the users.

As an illustrative example, training input data may, by way of example and not limitation, include a type of product created by users. Training output data may include data entered into associated fields (e.g., of a predetermined template) by the users.

As an illustrative example, training input data may, by way of example and not limitation, include shipping locations and/or carriers used. Corresponding training output data may, for example, include actual shipping times and/or other shipping outcomes.

As an illustrative example, training input data may, by way of example and not limitation, include chat data. The training input data may, for example, also include associated item data. Training output data may, for example, include actions taken by participants associated with the item data (e.g., item type, phase of product lifecycle) associated and/or chat data (e.g., keywords, predetermined chat actions, attitudes determined by natural language processing, user location(s)).

In some embodiments, before training, a set of testing data (including testing input data and testing output data) may be divided from the training data. After the tag suggestions injection engine 1300 is trained, the testing data may be applied to the trained model to test the training accuracy of the model. For example, the trained model may receive the testing input data and generate an output data in response to the testing input data. The generated output data may be compared with the testing output data to determine the prediction accuracy (e.g., based on a predetermined criterion(s) such as a maximum error threshold). In some embodiments, one or more models (e.g., neural network models) may be cascaded together. The cascaded model may be trained and tested.

During operation, item attributes 1315, public data stream(s) 1320, private data stream(s) 1325, and/or entity attributes 1326 may be provided as inputs to the (trained) tag suggestions injection engine 1300. The tag suggestions injection engine 1300 may generate, in response to the input (suggested) action(s) 1330, suggested attribute(s) 1335, and/or suggested rule(s) 1340. The item attributes 1315 may, for example, include tag data retrieved from CDT server 320. The public data stream(s) 1320 and/or private data stream(s) 1320 may, for example, include data from CDTs, from chat data (e.g., chat 235A, chat 235B), from the transaction database 370, rules (e.g., public data rules 220, user-defined public data rules 225, private data rules 240, access permissions 175), attributes (e.g., public attribute profile 210, user-defined public attribute profile 215, private attribute profile 230A, private attribute profile 230B), or some combination thereof. The entity attributes may, for example, include data extracted from chats, from the transaction entities 205, from attribute profiles, or some combination thereof.

As an illustrative example, a tag suggestions injection engine 1300 may operate on inputs including types of products that users are creating and types of changes made to corresponding templates. The tag suggestions injection engine 1300 may, for example, create an action(s) 1330 and/or a rule(s) 1340 corresponding to the change(s) as data structure(s) associated with the corresponding template(s) and/or product type(s). For example, the change may be incorporated into the corresponding template. In some implementations, for example, the change may be associated with a rule such that the change is suggested as a prompt to other users making that product in the future. The template(s) may, for example, include a contract template for design work. As a specific illustrative example, if a certain number (e.g., percentage, many, all) of designers of custom frames manually add a clause that gloss will be added after the stain is applied, the tag suggestions injection engine 1300 may generate a rule and associated contract attribute stored in association with the design contract template(s) and the "frame" item type that may cause a prompt to be generated for every frame maker to input whether the design contract should include adding gloss after the stain work.

As an illustrative example, a tag suggestions injection engine 1300 may operate on product data entered in association with items. The tag suggestions injection engine 1300 may determine that a certain number of users creating the same type of product enter common (e.g., identical, statistically similar) data into associated fields, the tag suggestions injection engine 1300 may generate action(s) (e.g., administrative review, user prompts), attribute(s) (e.g., template fields), and/or rule(s) such that the common data is applied across a system. As a specific illustrative example, 90% of customers of a certain kind of furniture may rate a specific manufacturer very highly (e.g., 4-star or above out of 5 stars). The tag suggestions injection engine 1300 may, by way of example and not limitation, generate an attribute associated with that furniture and generate an associated rule that causes an action (e.g., generated by the tag suggestions injection engine 1300) such as suggesting using that furniture maker to customers who select a product of a similar type.

as an illustrative example, the tag suggestions injection engine 1300 may operate on shipping data. The tag suggestions injection engine 1300 may determine that shipments from one certain location (e.g., geographical region, jurisdiction, shipping hub) to another certain location(s) may typically tend to run late. The tag suggestions injection engine 1300 may, by way of example and not limitation, further determine that the delay is associated with certain items and/or entities (e.g., carriers). The tag suggestions injection engine 1300 may, for example, generate a rule and associated action to caution users about the potential delay when their product is determined to correspond to a potential shipping from and to the identified locations (e.g., and the product is of the determined affected type(s) and/or corresponding type(s)).

In various implementations, by way of example and not limitation, the tag suggestions injection engine 1300 may operate to find patterns in aggregated individual entries and programmatically generating changes (e.g., suggested, automatically applied) to be injected on a customized basis. For example, the changes may be injected, by way of example and not limitation, to templates, the chat module, and/or the DTS 140 in general.

FIG. 14 depicts an exemplary method of training a tag suggestion injection engine. A method 1400 may, for example, be performed by a processor(s) (e.g., processor 305) executing a program(s) of instructions retrieved from a data store(s) (e.g., data store 355). The method 1400 includes, at a step 1405, receiving historical data (e.g., training input data 1305). At a step 1410, corresponding historical data (e.g., training output data 1310) are determined and retrieved.

At a step 1415, the retrieved data is divided into a first set of data used for training and a second set of data used for testing. At a step 1420, a model (e.g., a model(s) of the tag suggestions injection engine 1300) is applied to the training data to generate a trained model (e.g., neural network model). The trained model is applied to the testing data, in a step 1425, to generate test output(s) (e.g., action(s) 1330, attribute(s) 1335, rule(s) 1340). The output is evaluated, in a decision point 1430, to determine whether the model is successfully trained (e.g., by comparison to a predetermined training criterion(s)). The predetermined training criterion(s) may, for example, be a maximum error threshold. For example, if a difference between the actual output (the test data) and the predicted output (the test output) is within a predetermined range, then the model may be regarded as successfully trained. If the difference is not within the predetermined range, then the model may be regarded as not successfully trained. At a step 1435, the processor may generate a signal(s) requesting additional training data, and the method 1400 loops back to step 1425. If the model is determined, at the decision point 1430, to be successfully trained, then the trained model may be stored (e.g., in the storage module 330), in a step 1440, and the method 1400 ends.

Although various embodiments have been described with reference to the figures, other embodiments are possible.

Although an exemplary system has been described with reference to the figures, other implementations may be deployed in other industrial, scientific, medical, commercial, and/or residential applications.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a computer program product may include a program of instructions tangibly embodied on a computer readable medium. When the instructions are executed on a processor, the processor may cause operations to be performed to automatically associate private and public data of a transaction of a physical object with a uniquely-linked remotely accessible immutable digital object. The operations may include receive, from a digital terminal device, an update request signal corresponding to an update in an attribute of the physical object. The operations may include generate a public attribute profile associated with the transaction as a function of a first predetermined set of rules retrieved from a first datastore based on an association with the digital terminal device and the physical object. The public attribute profile may include a current date and a current location associated with the digital terminal device, and, one or more attributes received from the digital terminal device, based on: a second predetermined set of rules retrieved from a second datastore based on the digital terminal device and the physical object, and access authorization received from the digital terminal device. The operations may include generate, based on a third predetermined set of rules retrieved from a third datastore and the access authorization from the digital terminal device, a private attribute profile associated with the update. The operations may include generate a first immutable data structure including the public attribute profile, and a second immutable data structure including the private attribute profile and a set of predetermined access permissions associated with the private attribute profile. The operations may include update, by the processor, the digital object by digitally linking the first and the second immutable data structures with the digital object. The updated digital object may be configured such that, when a tag associated with a reference address of the digital object is scanned by an access device and the digital object are remotely retrieved, for each transaction, the public attribute profiles are accessible, but the private attribute profiles are restricted unless the set of predetermined access permissions corresponding to the private attribute profile are satisfied.

The set of predetermined access permissions may be generated based on input received from the digital terminal device.

The update may be associated with a transaction between a first party and a second party. The public attribute profile and the private attribute profile may be further generated based on authorization from the second party.

The operations may include generate the public attribute profile based on the first predetermined set of rules when the access authorization and the first predetermined set of rules conflict.

The operations may include generate, based on multiple public attribute profiles, wherein each public attribute profile corresponds to a transaction of the physical object, a graphical user interface displaying a location of each of the transaction.

At least one of the first predetermined set of rules, the second predetermined set of rules, and the third predetermined set of rules may require an authorization signal including a credential corresponding to an owner of the physical object before the digital object is updated.

The operations may include, when the transaction is a cross jurisdiction transaction from a first jurisdiction to a second jurisdiction, retrieve, by the processor, product labeling requirements of the second jurisdiction for the physical object based on predetermined attributes retrieved from the digital object.

The operations may include, in response to an authentication signal from an access device corresponding to a request for authentication of the physical object based on the tag associated with the physical object, perform product authentication operations. The product authentication operations may include retrieve, based on the authentication signal, the digital object corresponding to the physical object. The product authentication operations may include receive, from the access device, an encrypted private key. The product authentication operations may include apply a predetermined decrypting algorithm to the encrypted private key to generate a decrypted identifier. The product authentication operations may include, in response to determining that the decrypted identifier matches a unique product identifier associated with the digital object, then generate a display including attributes from the public attribute profiles and attributes from the private attribute profiles, according to a level of access associated with the access device by the predetermined access permissions.

The digital terminal device may be a first terminal device associated with a first user in a first predetermined geozone. The operations may include, in response to providing access to at least one of the public attribute profiles and the private attribute profile to a second terminal device associated with a second user in a second predetermined geozone, perform synchronization operations. The synchronization operations may include, in response to determining a first predetermined attribute of the physical object is displayed differently between the first predetermined geozone and the second predetermined geozone, determine at least one conversion operation. The synchronization operations may include apply the conversion operation to the first predetermined attribute such that the first predetermined attribute is received from the first user device in a first display format, is stored in association with the digital object, and is transmitted to the second user device for display to the second user in a second display format. In an illustrative aspect, a computer-implemented method may be performed by at least one processor to automatically associate private and public data of a transaction of a physical object with a uniquely-linked remotely accessible immutable digital object. The method may include receive, from a digital terminal device, an update request signal corresponding to an update in an attribute of the physical object. The method may include generate a public attribute profile associated with the transaction as a function of a first predetermined set of rules retrieved from a first datastore based on an association with the digital terminal device and the physical object. The public attribute profile may include a current date and a current location associated with the digital terminal device, and, one or more attributes received from the digital terminal device, based on: a second predetermined set of rules retrieved from a second datastore based on the digital terminal device and the physical object, and access authorization received from the digital terminal device. The method may include generate, based on a third predetermined set of rules retrieved from a third datastore and the access authorization from the digital terminal device, a private attribute profile associated with the update. The method may include generate a first immutable data structure including the public attribute profile, and a second immutable data structure including the private attribute profile and a set of predetermined access permissions associated with the private attribute profile. The method may include update, by the processor, the digital object by digitally linking the first and the second immutable data structures with the digital object. The updated digital object may be configured such that, when a tag associated with a reference address of the digital object is scanned by an access device and the digital object are remotely retrieved, for each transaction, the public attribute profiles are accessible, but the private attribute profiles are restricted unless the set of predetermined access permissions corresponding to the private attribute profile are satisfied.

The set of predetermined access permissions may be generated based on input received from the digital terminal device.

The update may be associated with a transaction between a first party and a second party. The public attribute profile and the private attribute profile may be further generated based on authorization from the second party. The transaction may be a transfer of ownership from the first party to the second party. The first party may currently hold access permissions to the immutable digital object corresponding to ownership of the physical object. The update may include a confirmation of successful completion of the transaction. The method may include record details of the transaction in the public attribute profile and the private attribute profile according to predetermined parsing rules. The method may include disassociating the access permission with the first party and associating the access permission with the second party.

The method may include generate the public attribute profile based on the first predetermined set of rules when the access authorization and the first predetermined set of rules conflict.

The method may include generate, based on multiple public attribute profiles, wherein each public attribute profile corresponds to a transaction of the physical object, a graphical user interface displaying a location of each of the transaction.

At least one of the first predetermined set of rules, the second predetermined set of rules, and the third predetermined set of rules may require an authorization signal including a credential corresponding to an owner of the physical object before the digital object is updated.

The method may include, when the transaction is a cross jurisdiction transaction from a first jurisdiction to a second jurisdiction, retrieve, by the processor, product labeling requirements of the second jurisdiction for the physical object based on predetermined attributes retrieved from the digital object.

The method may include, in response to an authentication signal from an access device corresponding to a request for authentication of the physical object based on the tag associated with the physical object, perform product authentication operations. The product authentication operations may include retrieve, based on the authentication signal, the digital object corresponding to the physical object. The product authentication operations may include receive, from the access device an encrypted private key. The product authentication operations may include apply a predetermined decrypting algorithm to the encrypted private key to generate a decrypted identifier. The product authentication operations may include, in response to determining that the decrypted identifier matches a unique product identifier associated with the digital object, then generate a display including attributes from the public attribute profiles and attributes from the private attribute profiles, according to a level of access associated with the access device by the predetermined access permissions.

The digital terminal device may be a first terminal device associated with a first user in a first predetermined geozone. The method may include, in response to providing access to at least one of the public attribute profiles and the private attribute profile to a second terminal device associated with a second user in a second predetermined geozone, perform synchronization operations. The synchronization operations may include, in response to determining a first predetermined attribute of the physical object is displayed differently between the first predetermined geozone and the second predetermined geozone, determine at least one conversion operation. The synchronization operations may include apply the conversion operation to the first predetermined attribute such that the first predetermined attribute is received from the first user device in a first display format, is stored in association with the digital object, and is transmitted to the second user device for display to the second user in a second display format.

In an illustrative aspect, a system may include a data store including a program of instructions. The system may include a processor operably coupled to the data store such that, when the processor executes the program of instructions, the processor causes operations to be performed to automatically associate private and public data of a transaction of a physical object with a uniquely-linked remotely accessible immutable digital object. The operations may include receive, from a digital terminal device, an update request signal corresponding to an update in an attribute of the physical object. The operations may include generate a public attribute profile associated with the transaction as a function of a first predetermined set of rules retrieved from a first datastore based on an association with the digital terminal device and the physical object. The public attribute profile may include a current date and a current location associated with the digital terminal device. The public attribute profile may include one or more attributes received from the digital terminal device, based on: a second predetermined set of rules retrieved from a second datastore based on the digital terminal device and the physical object, and access authorization received from the digital terminal device. The operations may include generate, based on a third predetermined set of rules retrieved from a third datastore and the access authorization from the digital terminal device, a private attribute profile associated with the update. The operations may include generate a first immutable data structure including the public attribute profile, and a second immutable data structure including the private attribute profile and a set of predetermined access permissions associated with the private attribute profile. The operations may include update, by the processor, the digital object by digitally linking the first and the second immutable data structures with the digital object, wherein the updated digital object is configured such that, when a tag associated with a reference address of the digital object is scanned by an access device and the digital object are remotely retrieved, for each transaction, the public attribute profiles are accessible, but the private attribute profiles are restricted unless the set of predetermined access permissions corresponding to the private attribute profile are satisfied.

The update may be associated with a transaction between a first party and a second party. The public attribute profile and the private attribute profile may be further generated based on authorization from the second party.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:
1. A computer program product comprising:
a program of instructions tangibly embodied on a computer readable medium wherein when the instructions are executed on a processor, the processor causes operations to be performed to automatically associate private and public data of a transaction of a physical object with a uniquely-linked remotely accessible immutable digital object, the operations comprising:
receive, from a digital terminal device, an update request signal corresponding to an update in an attribute of the physical object;
generate a public attribute profile associated with the transaction as a function of a first predetermined set of rules retrieved from a first datastore based on an association with the digital terminal device and the physical object, wherein the public attribute profile comprises:
a current date and a current location associated with the digital terminal device, and,
one or more attributes received from the digital terminal device, based on: a second predetermined set of rules retrieved from a second datastore based on the digital terminal device and the physical object, and access authorization received from the digital terminal device;
generate, based on a third predetermined set of rules retrieved from a third datastore and the access authorization from the digital terminal device, a private attribute profile associated with the update; and,
generate a first immutable data structure comprising the public attribute profile, and a second immutable data structure comprising the private attribute profile and a set of predetermined access permissions associated with the private attribute profile; and,
update, by the processor, the digital object by digitally linking the first and the second immutable data structures with the digital object, wherein the updated digital object is configured such that,
when a tag associated with a reference address of the digital object is scanned by an access device and the digital object are remotely retrieved, for each transaction, the public attribute profiles are accessible, but the private attribute profiles are restricted unless the set of predetermined access permissions corresponding to the private attribute profile are satisfied.

2. The computer program product of claim 1, wherein the set of predetermined access permissions are generated based on input received from the digital terminal device.

3. The computer program product of claim 1, wherein:
the update is associated with a transaction between a first party and a second party; and,
the public attribute profile and the private attribute profile are further generated based on authorization from the second party.

4. The computer program product of claim 1, further comprising generate the public attribute profile based on the first predetermined set of rules when the access authorization and the first predetermined set of rules conflict.

5. The computer program product of claim 1, further comprising generate, based on multiple public attribute profiles, wherein each public attribute profile corresponds to a transaction of the physical object, a graphical user interface displaying a location of each of the transaction.

6. The computer program product of claim 1, wherein at least one of the first predetermined set of rules, the second predetermined set of rules, and the third predetermined set of rules requires an authorization signal comprising a credential corresponding to an owner of the physical object before the digital object is updated.

7. The computer program product of claim 1, further comprising when the transaction is a cross-jurisdiction transaction from a first jurisdiction to a second jurisdiction, retrieve, by the processor, product labeling requirements of the second jurisdiction for the physical object based on predetermined attributes retrieved from the digital object.

8. The computer program product of claim 1, further comprising, in response to an authentication signal from an access device corresponding to a request for authentication of the physical object based on the tag associated with the physical object, perform product authentication operations, the product authentication operations comprising:
   retrieve, based on the authentication signal, the digital object corresponding to the physical object;
   receive, from the access device an encrypted private key;
   apply a predetermined decrypting algorithm to the encrypted private key to generate a decrypted identifier; and,
   in response to determining that the decrypted identifier matches a unique product identifier associated with the digital object, then generate a display comprising attributes from the public attribute profiles and attributes from the private attribute profiles, according to a level of access associated with the access device by the predetermined access permissions.

9. The computer program product of claim 1, wherein:
   the digital terminal device is a first terminal device associated with a first user in a first predetermined geozone;
   the operations further comprise, in response to providing access to at least one of the public attribute profiles and the private attribute profile to a second terminal device associated with a second user in a second predetermined geozone, perform synchronization operations, the synchronization operations comprising:
      in response to determining a first predetermined attribute of the physical object is displayed differently between the first predetermined geozone and the second predetermined geozone, determine at least one conversion operation; and,
      apply the conversion operation to the first predetermined attribute such that the first predetermined attribute is received from the first user device in a first display format, is stored in association with the digital object, and is transmitted to the second user device for display to the second user in a second display format.

10. A computer-implemented method performed by at least one processor to automatically associate private and public data of a transaction of a physical object with a uniquely-linked remotely accessible immutable digital object, the method comprising:
   receive, from a digital terminal device, an update request signal corresponding to an update in an attribute of the physical object;
   generate a public attribute profile associated with the transaction as a function of a first predetermined set of rules retrieved from a first datastore based on an association with the digital terminal device and the physical object, wherein the public attribute profile comprises:
      a current date and a current location associated with the digital terminal device, and,
      one or more attributes received from the digital terminal device, based on: a second predetermined set of rules retrieved from a second datastore based on the digital terminal device and the physical object, and access authorization received from the digital terminal device;
   generate, based on a third predetermined set of rules retrieved from a third datastore and the access authorization from the digital terminal device, a private attribute profile associated with the update; and,
   generate a first immutable data structure comprising the public attribute profile, and a second immutable data structure comprising the private attribute profile and a set of predetermined access permissions associated with the private attribute profile; and,
   update, by the processor, the digital object by digitally linking the first and the second immutable data structures with the digital object, wherein the updated digital object is configured such that,
   when a tag associated with a reference address of the digital object is scanned by an access device and the digital object are remotely retrieved, for each transaction, the public attribute profiles are accessible, but the private attribute profiles are restricted unless the set of predetermined access permissions corresponding to the private attribute profile are satisfied.

11. The method of claim 10, wherein the set of predetermined access permissions are generated based on input received from the digital terminal device.

12. The method of claim 10, wherein:
   the update is associated with a transaction between a first party and a second party; and,
   the public attribute profile and the private attribute profile are further generated based on authorization from the second party.

13. The method of claim 12, wherein:
   the transaction is a transfer of ownership from the first party to the second party,
   the first party currently holds access permissions to the immutable digital object corresponding to ownership of the physical object,
   the update comprises a confirmation of successful completion of the transaction, and
   the method further comprises:
      record details of the transaction in the public attribute profile and the private attribute profile according to predetermined parsing rules; and,
      disassociating the access permission with the first party and associating the access permission with the second party.

14. The method of claim 10, further comprising generate the public attribute profile based on the first predetermined set of rules when the access authorization and the first predetermined set of rules conflict.

15. The method of claim 10, further comprising generate, based on multiple public attribute profiles, wherein each public attribute profile corresponds to a transaction of the physical object, a graphical user interface displaying a location of each of the transaction.

16. The method of claim 10, wherein at least one of the first predetermined set of rules, the second predetermined set of rules, and the third predetermined set of rules requires an authorization signal comprising a credential corresponding to an owner of the physical object before the digital object is updated.

17. The method of claim 10, further comprising when the transaction is a cross jurisdiction transaction from a first jurisdiction to a second jurisdiction, retrieve, by the processor, product labeling requirements of the second jurisdiction for the physical object based on predetermined attributes retrieved from the digital object.

18. The method of claim 10, further comprising, in response to an authentication signal from an access device corresponding to a request for authentication of the physical object based on the tag associated with the physical object, perform product authentication operations, the product authentication operations comprising:

retrieve, based on the authentication signal, the digital object corresponding to the physical object;

receive, from the access device an encrypted private key;

apply a predetermined decrypting algorithm to the encrypted private key to generate a decrypted identifier; and, in response to determining that the decrypted identifier matches a unique product identifier associated with the digital object, then generate a display comprising attributes from the public attribute profiles and attributes from the private attribute profiles, according to a level of access associated with the access device by the predetermined access permissions.

19. The method of claim 10, wherein:

the digital terminal device is a first terminal device associated with a first user in a first predetermined geozone; and, the method further comprise, in response to providing access to at least one of the public attribute profiles and the private attribute profile to a second terminal device associated with a second user in a second predetermined geozone, perform synchronization operations, the synchronization operations comprising:

in response to determining a first predetermined attribute of the physical object is displayed differently between the first predetermined geozone and the second predetermined geozone, determine at least one conversion operation; and, apply the conversion operation to the first predetermined attribute such that the first predetermined attribute is received from the first user device in a first display format, is stored in association with the digital object, and is transmitted to the second user device for display to the second user in a second display format.

20. A system comprising:

a data store comprising a program of instructions; and, a processor operably coupled to the data store such that, when the processor executes the program of instructions, the processor causes operations to be performed to automatically associate private and public data of a transaction of a physical object with a uniquely-linked remotely accessible immutable digital object, the operations comprising:

receive, from a digital terminal device, an update request signal corresponding to an update in an attribute of the physical object;

generate a public attribute profile associated with the transaction as a function of a first predetermined set of rules retrieved from a first datastore based on an association with the digital terminal device and the physical object, wherein the public attribute profile comprises:

a current date and a current location associated with the digital terminal device, and, one or more attributes received from the digital terminal device, based on: a second predetermined set of rules retrieved from a second datastore based on the digital terminal device and the physical object, and access authorization received from the digital terminal device;

generate, based on a third predetermined set of rules retrieved from a third datastore and the access authorization from the digital terminal device, a private attribute profile associated with the update; and, generate a first immutable data structure comprising the public attribute profile, and a second immutable data structure comprising the private attribute profile and a set of predetermined access permissions associated with the private attribute profile; and, update, by the processor, the digital object by digitally linking the first and the second immutable data structures with the digital object, wherein the updated digital object is configured such that, when a tag associated with a reference address of the digital object is scanned by an access device and the digital object are remotely retrieved, for each transaction, the public attribute profiles are accessible, but the private attribute profiles are restricted unless the set of predetermined access permissions corresponding to the private attribute profile are satisfied.

21. The system of claim 20, wherein:

the update is associated with a transaction between a first party and a second party; and, the public attribute profile and the private attribute profile are further generated based on authorization from the second party.

* * * * *